(12) United States Patent
Zambrano et al.

(10) Patent No.: US 9,752,488 B2
(45) Date of Patent: Sep. 5, 2017

(54) SYSTEMS AND METHODS OF AN ON-BOARD NOX MONITOR RESET TEST

(71) Applicant: Cummins, Inc., Columbus, IN (US)

(72) Inventors: Cristian Aldana Zambrano, Columbus, IN (US); Michael J. McGuire, Columbus, IN (US); Josh Si Shao, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 3 days.

(21) Appl. No.: 14/924,228

(22) Filed: Oct. 27, 2015

(65) Prior Publication Data

US 2017/0114697 A1  Apr. 27, 2017

(51) Int. Cl.
| | |
|---|---|
| F01N 3/00 | (2006.01) |
| F01N 11/00 | (2006.01) |
| F02D 41/08 | (2006.01) |
| F02D 41/00 | (2006.01) |
| F02D 41/02 | (2006.01) |
| F01N 3/20 | (2006.01) |

(52) U.S. Cl.
CPC .......... *F01N 11/007* (2013.01); *F01N 3/2066* (2013.01); *F02D 41/0087* (2013.01); *F02D 41/022* (2013.01); *F02D 41/024* (2013.01); *F02D 41/0225* (2013.01); *F02D 41/08* (2013.01); *F02D 2200/501* (2013.01)

(58) Field of Classification Search
USPC .......... 60/274, 276, 277, 286, 295, 297, 301
See application file for complete search history.

(56) References Cited

U.S. PATENT DOCUMENTS

| | | | |
|---|---|---|---|
| 7,073,320 B2* | 7/2006 | Moritsugu | G01N 33/007 123/688 |
| 8,286,419 B2 | 10/2012 | Levijoki et al. | |
| 8,607,625 B2 | 12/2013 | Kowalkowski et al. | |
| 9,038,369 B2* | 5/2015 | Khaled | F01N 11/00 60/274 |
| 9,097,195 B2* | 8/2015 | Willard | B60T 17/221 |
| 2013/0306171 A1* | 11/2013 | Nagaoka | B01D 53/9409 137/551 |
| 2015/0113953 A1* | 4/2015 | Nilsson | F01N 3/2066 60/274 |

FOREIGN PATENT DOCUMENTS

EP    2 115 282    11/2009

* cited by examiner

*Primary Examiner* — Binh Q Tran
(74) *Attorney, Agent, or Firm* — Foley & Lardner LLP

(57) ABSTRACT

An apparatus includes a stationary conditions circuit structured to received information indicative of a stationary condition of a vehicle having an exhaust aftertreatment system; an engine circuit structured to cause an elevated operating mode in response to the detection of the stationary condition; and a nitrous oxide (NOx) monitor reset circuit. The NOx monitor reset circuit may be structured to: receive vehicle operation data indicative of an enable condition for a NOx monitor reset process; in response to the enable condition, receive NOx data indicative of a NOx amount exiting the exhaust aftertreatment system as part of the NOx monitor reset process; compare the NOx data to an estimated NOx amount; and in response to the comparison, selectively diagnose the exhaust aftertreatment system as one of a healthy and a degraded exhaust aftertreatment system.

20 Claims, 18 Drawing Sheets

| Engine Speed | Fan status  | AAT | IMT | SOI | PRS | PIF  | PIT | POF  | POT | CutOut |
|--------------|-------------|-----|-----|-----|-----|------|-----|------|-----|--------|
| 2200         | Fan Covered | 27  | 62  |     | -1  | 2590 | 20  | 1000 | 20  | 1050 Y |

| EONOx_est | SONOx_Sensd | SONOx_est | NOxErr | Fueling | Bed_Temp | DEF | ANR  |
|-----------|-------------|-----------|--------|---------|----------|-----|------|
| 277       | 423         |           | 107    | 306     | 160      | 283 | 0    | 0.99 |

Final Timing

| X/Y | 0 | 5 | 15 | 45 | 55 | 75 | 90 | 115 | 133 | 169 | 190 | 210 | 230 | 250 | 295 | 365 |
|---|---|---|---|---|---|---|---|---|---|---|---|---|---|---|---|---|
| 0 | 4 | 0 | 0 | 0 | 0 | 0 | 0 | 0 | 0 | 0 | 0 | 0 | 0 | 0 | 0 | 0 |
| 550 | 4 | 0 | 0 | 0 | 0 | 0 | 0 | 0 | 0 | 0 | 0 | 0 | 0 | 0 | 0 | 0 |
| 580 | 4 | 0 | 0 | 0 | 0 | 0 | 0 | 0 | 0 | 0 | 0 | 0 | 0 | 0 | 0 | 0 |
| 820 | 4 | 0 | 0 | 0 | 0 | 0 | 0 | 0 | 0 | 0 | 0 | 0 | 0 | 0 | 0 | 0 |
| 900 | 4 | 0 | 0 | 0 | 0 | 0 | 0 | 0 | 0 | 0 | 0 | 0 | 0 | 0 | 0 | 0 |
| 1000 | 4 | 0 | 0 | 0 | 0 | 0 | 0 | 0 | 0 | 0 | 0 | 0 | 0 | 0 | 0 | 0 |
| 1100 | 4 | 0 | 0 | 0 | 0 | 0 | 0 | 0 | 0 | 0 | 0 | 0 | 0 | 0 | 0 | 0 |
| 1140 | 4 | 0 | 0 | 0 | 0 | 0 | 0 | 0 | 0 | 0 | 0 | 0 | 0 | 0 | 0 | 0 |
| 1200 | 4 | 0 | 0 | 0 | 0 | 0 | 0 | 0 | 0 | 0 | 0 | 0 | 0 | 0 | 0 | 0 |
| 1300 | 4 | 0 | 0 | 0 | 0 | 0 | 0 | 0 | 0 | 0 | 0 | 0 | 0 | 0 | 0 | 0 |
| 1400 | 4 | 0 | 0 | 0 | 0 | 0 | 0 | 0 | 0 | 0 | 0 | 0 | 0 | 0 | 0 | 0 |
| 1500 | 4 | 0 | 0 | 0 | 0 | 0 | 0 | 0 | 0 | 0 | 0 | 0 | 0 | 0 | 0 | 0 |
| 1600 | 4 | 0 | 0 | 0 | 0 | 0 | 0 | 0 | 0 | 0 | 0 | 0 | 0 | 0 | 0 | 0 |
| 1700 | 4 | 0 | 0 | 0 | 0 | 0 | 0 | 0 | 0 | 0 | 0 | 0 | 0 | 0 | 0 | 0 |
| 1800 | 4 | 0 | 0 | 0 | 0 | 0 | 0 | 0 | 0 | 0 | 0 | 0 | 0 | 0 | 0 | 0 |
| 1900 | 4 | -1 | -1 | -1 | -1 | -1 | -1 | -1 | -1 | -1 | -1 | -1 | -1 | -1 | -1 | -1 |
| 2000 | 4 | -1 | -1 | -1 | -1 | -1 | -1 | -1 | -1 | -1 | -1 | -1 | -1 | -1 | -1 | -1 |
| 2130 | 4 | -1 | -1 | -1 | -1 | -1 | -1 | -1 | -1 | -1 | -1 | -1 | -1 | -1 | -1 | -1 |
| 2300 | 4 | -1 | -1 | -1 | -1 | -1 | -1 | -1 | -1 | -1 | -1 | -1 | -1 | -1 | -1 | -1 |

FIG. 12

Rail Pressure

| X/Y | 0 | 5 | 15 | 45 | 55 | 75 | 90 | 115 | 133 | 169 | 190 | 210 | 230 | 250 | 295 | 365 |
|---|---|---|---|---|---|---|---|---|---|---|---|---|---|---|---|---|
| 0 | 500 | 1000 | 1000 | 1000 | 1000 | 1000 | 1000 | 1000 | 1000 | 1000 | 1000 | 1000 | 1000 | 1000 | 1000 | 1000 |
| 550 | 500 | 1000 | 1000 | 1000 | 1000 | 1000 | 1000 | 1000 | 1000 | 1000 | 1000 | 1000 | 1000 | 1000 | 1000 | 1000 |
| 580 | 500 | 1000 | 1000 | 1000 | 1000 | 1000 | 1000 | 1000 | 1000 | 1000 | 1000 | 1000 | 1000 | 1000 | 1000 | 1000 |
| 820 | 500 | 1000 | 1000 | 1000 | 1000 | 1000 | 1000 | 1000 | 1000 | 1000 | 1000 | 1000 | 1000 | 1000 | 1000 | 1000 |
| 900 | 500 | 1000 | 1000 | 1000 | 1000 | 1000 | 1000 | 1000 | 1000 | 1000 | 1000 | 1000 | 1000 | 1000 | 1000 | 1000 |
| 1000 | 500 | 1000 | 1000 | 1000 | 1000 | 1000 | 1000 | 1000 | 1000 | 1000 | 1000 | 1000 | 1000 | 1000 | 1000 | 1000 |
| 1100 | 500 | 1000 | 1000 | 1000 | 1000 | 1000 | 1000 | 1000 | 1000 | 1000 | 1000 | 1000 | 1000 | 1000 | 1000 | 1000 |
| 1140 | 500 | 1000 | 1000 | 1000 | 1000 | 1000 | 1000 | 1000 | 1000 | 1000 | 1000 | 1000 | 1000 | 1000 | 1000 | 1000 |
| 1200 | 500 | 1000 | 1000 | 1000 | 1000 | 1000 | 1000 | 1000 | 1000 | 1000 | 1000 | 1000 | 1000 | 1000 | 1000 | 1000 |
| 1300 | 500 | 1000 | 1000 | 1000 | 1000 | 1000 | 1000 | 1000 | 1000 | 1000 | 1000 | 1000 | 1000 | 1000 | 1000 | 1000 |
| 1400 | 500 | 1000 | 1000 | 1000 | 1000 | 1000 | 1000 | 1000 | 1000 | 1000 | 1000 | 1000 | 1000 | 1000 | 1000 | 1000 |
| 1500 | 500 | 1000 | 1000 | 1000 | 1000 | 1000 | 1000 | 1000 | 1000 | 1000 | 1000 | 1000 | 1000 | 1000 | 1000 | 1000 |
| 1600 | 500 | 1000 | 1000 | 1000 | 1000 | 1000 | 1000 | 1000 | 1000 | 1000 | 1000 | 1000 | 1000 | 1000 | 1000 | 1000 |
| 1700 | 500 | 1000 | 1000 | 1000 | 1000 | 1000 | 1000 | 1000 | 1000 | 1000 | 1000 | 1000 | 1000 | 1000 | 1000 | 1000 |
| 1800 | 300 | 1000 | 1000 | 1000 | 1000 | 1000 | 1000 | 1000 | 1000 | 1000 | 1000 | 1000 | 1000 | 1000 | 1000 | 1000 |
| 1900 | 300 | 2590 | 2590 | 2590 | 2590 | 2590 | 2590 | 2590 | 2590 | 2590 | 2590 | 2590 | 2590 | 2590 | 2590 | 2590 |
| 2000 | 300 | 2590 | 2590 | 2590 | 2590 | 2590 | 2590 | 2590 | 2590 | 2590 | 2590 | 2590 | 2590 | 2590 | 2590 | 2590 |
| 2130 | 300 | 2590 | 2590 | 2590 | 2590 | 2590 | 2590 | 2590 | 2590 | 2590 | 2590 | 2590 | 2590 | 2590 | 2590 | 2590 |
| 2300 | 300 | 2590 | 2590 | 2590 | 2590 | 2590 | 2590 | 2590 | 2590 | 2590 | 2590 | 2590 | 2590 | 2590 | 2590 | 2590 |
| 2400 | 300 | 2590 | 2590 | 2590 | 2590 | 2590 | 2590 | 2590 | 2590 | 2590 | 2590 | 2590 | 2590 | 2590 | 2590 | 2590 |
| 2500 | 300 | 2590 | 2590 | 2590 | 2590 | 2590 | 2590 | 2590 | 2590 | 2590 | 2590 | 2590 | 2590 | 2590 | 2590 | 2590 |
| 2600 | 300 | 2590 | 2590 | 2590 | 2590 | 2590 | 2590 | 2590 | 2590 | 2590 | 2590 | 2590 | 2590 | 2590 | 2590 | 2590 |
| 2700 | 300 | 2590 | 2590 | 2590 | 2590 | 2590 | 2590 | 2590 | 2590 | 2590 | 2590 | 2590 | 2590 | 2590 | 2590 | 2590 |
| 2800 | 300 | 2590 | 2590 | 2590 | 2590 | 2590 | 2590 | 2590 | 2590 | 2590 | 2590 | 2590 | 2590 | 2590 | 2590 | 2590 |
| 2900 | 300 | 2590 | 2590 | 2590 | 2590 | 2590 | 2590 | 2590 | 2590 | 2590 | 2590 | 2590 | 2590 | 2590 | 2590 | 2590 |

FIG. 13

Pilot Fueling Quantity

| X/Y | 0 | 5 | 15 | 45 | 55 | 75 | 90 | 115 | 133 | 169 | 190 | 210 | 230 | 250 | 295 | 365 |
|---|---|---|---|---|---|---|---|---|---|---|---|---|---|---|---|---|
| 0    | 0 | 0 | 0 | 0 | 0 | 0 | 0 | 0 | 0 | 0 | 0 | 0 | 0 | 0 | 0 | 0 |
| 550  | 0 | 0 | 0 | 0 | 0 | 0 | 0 | 0 | 0 | 0 | 0 | 0 | 0 | 0 | 0 | 0 |
| 580  | 0 | 0 | 0 | 0 | 0 | 0 | 0 | 0 | 0 | 0 | 0 | 0 | 0 | 0 | 0 | 0 |
| 820  | 0 | 0 | 0 | 0 | 0 | 0 | 0 | 0 | 0 | 0 | 0 | 0 | 0 | 0 | 0 | 0 |
| 900  | 0 | 0 | 0 | 0 | 0 | 0 | 0 | 0 | 0 | 0 | 0 | 0 | 0 | 0 | 0 | 0 |
| 1000 | 0 | 0 | 0 | 0 | 0 | 0 | 0 | 0 | 0 | 0 | 0 | 0 | 0 | 0 | 0 | 0 |
| 1100 | 0 | 0 | 0 | 0 | 0 | 0 | 0 | 0 | 0 | 0 | 0 | 0 | 0 | 0 | 0 | 0 |
| 1140 | 0 | 0 | 0 | 0 | 0 | 0 | 0 | 0 | 0 | 0 | 0 | 0 | 0 | 0 | 0 | 0 |
| 1200 | 0 | 0 | 0 | 0 | 0 | 0 | 0 | 0 | 0 | 0 | 0 | 0 | 0 | 0 | 0 | 0 |
| 1300 | 0 | 0 | 0 | 0 | 0 | 0 | 0 | 0 | 0 | 0 | 0 | 0 | 0 | 0 | 0 | 0 |
| 1400 | 0 | 0 | 0 | 0 | 0 | 0 | 0 | 0 | 0 | 0 | 0 | 0 | 0 | 0 | 0 | 0 |
| 1500 | 0 | 0 | 0 | 0 | 0 | 0 | 0 | 0 | 0 | 0 | 0 | 0 | 0 | 0 | 0 | 0 |
| 1600 | 0 | 0 | 0 | 0 | 0 | 0 | 0 | 0 | 0 | 0 | 0 | 0 | 0 | 0 | 0 | 0 |
| 1700 | 0 | 0 | 0 | 0 | 0 | 0 | 0 | 0 | 0 | 0 | 0 | 0 | 0 | 0 | 0 | 0 |
| 1800 | 0 | 0 | 0 | 0 | 0 | 0 | 0 | 0 | 0 | 0 | 0 | 0 | 0 | 0 | 0 | 0 |
| 1900 | 0 | 20 | 20 | 20 | 20 | 20 | 20 | 20 | 20 | 20 | 20 | 20 | 20 | 20 | 20 | 20 |
| 2000 | 0 | 20 | 20 | 20 | 20 | 20 | 20 | 20 | 20 | 20 | 20 | 20 | 20 | 20 | 20 | 20 |
| 2130 | 0 | 20 | 20 | 20 | 20 | 20 | 20 | 20 | 20 | 20 | 20 | 20 | 20 | 20 | 20 | 20 |
| 2300 | 0 | 20 | 20 | 20 | 20 | 20 | 20 | 20 | 20 | 20 | 20 | 20 | 20 | 20 | 20 | 20 |

FIG. 14

Pilot Fueling Timing

| X/Y | 0 | 5 | 15 | 45 | 55 | 75 | 90 | 115 | 133 | 169 | 190 | 210 | 230 | 250 | 295 | 365 |
|---|---|---|---|---|---|---|---|---|---|---|---|---|---|---|---|---|
| 0 | 1000 | 1000 | 1040 | 1040 | 1040 | 1040 | 1040 | 1040 | 1040 | 1040 | 1040 | 1040 | 1040 | 1040 | 1040 | 1040 |
| 550 | 1000 | 1000 | 1040 | 1040 | 1040 | 1040 | 1040 | 1040 | 1040 | 1040 | 1040 | 1040 | 1040 | 1040 | 1040 | 1040 |
| 580 | 1000 | 1000 | 1040 | 1040 | 1040 | 1040 | 1040 | 1040 | 1040 | 1040 | 1040 | 1040 | 1040 | 1040 | 1040 | 1040 |
| 820 | 1000 | 1000 | 1040 | 1040 | 1040 | 1040 | 1040 | 1040 | 1040 | 1040 | 1040 | 1040 | 1040 | 1040 | 1040 | 1040 |
| 900 | 1000 | 1000 | 1040 | 1040 | 1040 | 1040 | 1040 | 1040 | 1040 | 1040 | 1040 | 1040 | 1040 | 1040 | 1040 | 1040 |
| 1000 | 1000 | 1000 | 1040 | 1040 | 1040 | 1040 | 1040 | 1040 | 1040 | 1040 | 1040 | 1040 | 1040 | 1040 | 1040 | 1040 |
| 1100 | 1000 | 1000 | 1040 | 1040 | 1040 | 1040 | 1040 | 1040 | 1040 | 1040 | 1040 | 1040 | 1040 | 1040 | 1040 | 1040 |
| 1140 | 1000 | 1000 | 1040 | 1040 | 1040 | 1040 | 1040 | 1040 | 1040 | 1040 | 1040 | 1040 | 1040 | 1040 | 1040 | 1040 |
| 1200 | 1000 | 1000 | 1040 | 1040 | 1040 | 1040 | 1040 | 1040 | 1040 | 1040 | 1040 | 1040 | 1040 | 1040 | 1040 | 1040 |
| 1300 | 1000 | 1000 | 1040 | 1040 | 1040 | 1040 | 1040 | 1040 | 1040 | 1040 | 1040 | 1040 | 1040 | 1040 | 1040 | 1040 |
| 1400 | 1000 | 1000 | 1040 | 1040 | 1040 | 1040 | 1040 | 1040 | 1040 | 1040 | 1040 | 1040 | 1040 | 1040 | 1040 | 1040 |
| 1500 | 1000 | 1000 | 1040 | 1040 | 1040 | 1040 | 1040 | 1040 | 1040 | 1040 | 1040 | 1040 | 1040 | 1040 | 1040 | 1040 |
| 1600 | 1000 | 1000 | 1040 | 1040 | 1040 | 1040 | 1040 | 1040 | 1040 | 1040 | 1040 | 1040 | 1040 | 1040 | 1040 | 1040 |
| 1700 | 1000 | 1000 | 1040 | 1040 | 1040 | 1040 | 1040 | 1040 | 1040 | 1040 | 1040 | 1040 | 1040 | 1040 | 1040 | 1040 |
| 1800 | 1000 | 1000 | 1000 | 1000 | 1000 | 1000 | 1000 | 1000 | 1000 | 1000 | 1040 | 1000 | 1000 | 1000 | 1000 | 1000 |
| 1900 | 1000 | 1000 | 1000 | 1000 | 1000 | 1000 | 1000 | 1000 | 1000 | 1000 | 1000 | 1000 | 1000 | 1000 | 1000 | 1000 |
| 2000 | 1000 | 1000 | 1000 | 1000 | 1000 | 1000 | 1000 | 1000 | 1000 | 1000 | 1000 | 1000 | 1000 | 1000 | 1000 | 1000 |
| 2130 | 1000 | 1000 | 1000 | 1000 | 1000 | 1000 | 1000 | 1000 | 1000 | 1000 | 1000 | 1000 | 1000 | 1000 | 1000 | 1000 |
| 2300 | 1000 | 1000 | 1000 | 1000 | 1000 | 1000 | 1000 | 1000 | 1000 | 1000 | 1000 | 1000 | 1000 | 1000 | 1000 | 1000 |

FIG. 15

Post Fueling Quantity

| X/Y | 0 | 5 | 15 | 45 | 55 | 75 | 90 | 115 | 133 | 169 | 190 | 210 | 230 | 250 | 295 | 365 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 550 | 0 | 0 | 0 | 0 | 0 | 0 | 0 | 0 | 0 | 0 | 0 | 0 | 0 | 0 | 0 | 0 |
| 580 | 0 | 0 | 0 | 0 | 0 | 0 | 0 | 0 | 0 | 0 | 0 | 0 | 0 | 0 | 0 | 0 |
| 820 | 0 | 0 | 0 | 0 | 0 | 0 | 0 | 0 | 0 | 0 | 0 | 0 | 0 | 0 | 0 | 0 |
| 900 | 0 | 0 | 0 | 0 | 0 | 0 | 0 | 0 | 0 | 0 | 0 | 0 | 0 | 0 | 0 | 0 |
| 1000 | 0 | 0 | 0 | 0 | 0 | 0 | 0 | 0 | 0 | 0 | 0 | 0 | 0 | 0 | 0 | 0 |
| 1100 | 0 | 0 | 0 | 0 | 0 | 0 | 0 | 0 | 0 | 0 | 0 | 0 | 0 | 0 | 0 | 0 |
| 1140 | 0 | 0 | 0 | 0 | 0 | 0 | 0 | 0 | 0 | 0 | 0 | 0 | 0 | 0 | 0 | 0 |
| 1200 | 0 | 0 | 0 | 0 | 0 | 0 | 0 | 0 | 0 | 0 | 0 | 0 | 0 | 0 | 0 | 0 |
| 1300 | 0 | 0 | 0 | 0 | 0 | 0 | 0 | 0 | 0 | 0 | 0 | 0 | 0 | 0 | 0 | 0 |
| 1400 | 0 | 0 | 0 | 0 | 0 | 0 | 0 | 0 | 0 | 0 | 0 | 0 | 0 | 0 | 0 | 0 |
| 1500 | 0 | 0 | 0 | 0 | 0 | 0 | 0 | 0 | 0 | 0 | 0 | 0 | 0 | 0 | 0 | 0 |
| 1600 | 0 | 0 | 0 | 0 | 0 | 0 | 0 | 0 | 0 | 0 | 0 | 0 | 0 | 0 | 0 | 0 |
| 1700 | 0 | 0 | 0 | 0 | 0 | 0 | 0 | 0 | 0 | 0 | 0 | 0 | 0 | 0 | 0 | 0 |
| 1800 | 0 | 0 | 20 | 20 | 20 | 20 | 20 | 20 | 20 | 20 | 20 | 20 | 20 | 20 | 20 | 20 |
| 1900 | 0 | 20 | 20 | 20 | 20 | 20 | 20 | 20 | 20 | 20 | 20 | 20 | 20 | 20 | 20 | 20 |
| 2000 | 0 | 20 | 20 | 20 | 20 | 20 | 20 | 20 | 20 | 20 | 20 | 20 | 20 | 20 | 20 | 20 |
| 2130 | 0 | 20 | 20 | 20 | 20 | 20 | 20 | 20 | 20 | 20 | 20 | 20 | 20 | 20 | 20 | 20 |
| 2300 | 0 | 20 | 20 | 20 | 20 | 20 | 20 | 20 | 20 | 20 | 20 | 20 | 20 | 20 | 20 | 20 |

FIG. 16

Post Fueling Timing

| X/Y | 0 | 5 | 15 | 45 | 55 | 75 | 90 | 115 | 133 | 169 | 190 | 210 | 230 | 250 | 295 | 365 |
|---|---|---|---|---|---|---|---|---|---|---|---|---|---|---|---|---|
| 0 | 400 | 400 | 400 | 400 | 400 | 400 | 400 | 400 | 400 | 400 | 400 | 400 | 400 | 400 | 400 | 400 |
| 550 | 400 | 400 | 400 | 400 | 400 | 400 | 400 | 400 | 400 | 400 | 400 | 400 | 400 | 400 | 400 | 400 |
| 580 | 400 | 400 | 400 | 400 | 400 | 400 | 400 | 400 | 400 | 400 | 400 | 400 | 400 | 400 | 400 | 400 |
| 820 | 400 | 400 | 400 | 400 | 400 | 400 | 400 | 400 | 400 | 400 | 400 | 400 | 400 | 400 | 400 | 400 |
| 900 | 400 | 400 | 400 | 400 | 400 | 400 | 400 | 400 | 400 | 400 | 400 | 400 | 400 | 400 | 400 | 400 |
| 1000 | 400 | 400 | 400 | 400 | 400 | 400 | 400 | 400 | 400 | 400 | 400 | 400 | 400 | 400 | 400 | 400 |
| 1100 | 400 | 400 | 400 | 400 | 400 | 400 | 400 | 400 | 400 | 400 | 400 | 400 | 400 | 400 | 400 | 400 |
| 1140 | 400 | 400 | 400 | 400 | 400 | 400 | 400 | 400 | 400 | 400 | 400 | 400 | 400 | 400 | 400 | 400 |
| 1200 | 400 | 400 | 400 | 400 | 400 | 400 | 400 | 400 | 400 | 400 | 400 | 400 | 400 | 400 | 400 | 400 |
| 1300 | 400 | 400 | 400 | 400 | 400 | 400 | 400 | 400 | 400 | 400 | 400 | 400 | 400 | 400 | 400 | 400 |
| 1400 | 400 | 400 | 400 | 400 | 400 | 400 | 400 | 400 | 400 | 400 | 400 | 400 | 400 | 400 | 400 | 400 |
| 1500 | 400 | 400 | 400 | 400 | 400 | 400 | 400 | 400 | 400 | 400 | 400 | 400 | 400 | 400 | 400 | 400 |
| 1600 | 400 | 400 | 400 | 400 | 400 | 400 | 400 | 400 | 400 | 400 | 400 | 400 | 400 | 400 | 400 | 400 |
| 1700 | 400 | 400 | 400 | 400 | 400 | 400 | 400 | 400 | 400 | 400 | 400 | 400 | 400 | 400 | 400 | 400 |
| 1800 | 1050 | 1050 | 1050 | 1050 | 1050 | 1050 | 1050 | 1050 | 1050 | 1050 | 1050 | 1050 | 1050 | 1050 | 1050 | 1050 |
| 1900 | 1050 | 1050 | 1050 | 1050 | 1050 | 1050 | 1050 | 1050 | 1050 | 1050 | 1050 | 1050 | 1050 | 1050 | 1050 | 1050 |
| 2000 | 1050 | 1050 | 1050 | 1050 | 1050 | 1050 | 1050 | 1050 | 1050 | 1050 | 1050 | 1050 | 1050 | 1050 | 1050 | 1050 |
| 2130 | 1050 | 1050 | 1050 | 1050 | 1050 | 1050 | 1050 | 1050 | 1050 | 1050 | 1050 | 1050 | 1050 | 1050 | 1050 | 1050 |
| 2300 | 1050 | 1050 | 1050 | 1050 | 1050 | 1050 | 1050 | 1050 | 1050 | 1050 | 1050 | 1050 | 1050 | 1050 | 1050 | 1050 |

FIG. 17

SYSTEMS AND METHODS OF AN ON-BOARD NOX MONITOR RESET TEST

TECHNICAL FIELD

The present disclosure relates to diagnostic procedures for exhaust aftertreatment systems.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing.

SUMMARY

One embodiment relates to an apparatus. The apparatus includes a stationary conditions circuit structured to received information indicative of a stationary condition of a vehicle having an exhaust aftertreatment system; an engine circuit coupled to the stationary conditions circuit, wherein the engine circuit is structured to cause an elevated operating mode in response to the detection of the stationary condition; and a nitrous oxide (NOx) monitor reset circuit communicably coupled to the stationary conditions circuit and the engine circuit. According to one embodiment, the NOx monitor reset circuit is structured to: receive vehicle operation data indicative of an enable condition for a NOx monitor reset process; in response to the enable condition, receive NOx data indicative of a NOx amount exiting the exhaust aftertreatment system as part of the NOx monitor reset process; compare the NOx data to an estimated NOx amount; and in response to the comparison, selectively diagnose the exhaust aftertreatment system as one of a healthy and a degraded exhaust aftertreatment system.

Another embodiment relates to a method. The method includes receiving, by a controller, vehicle operation data indicative of a stationary condition for a vehicle having an engine fluidly coupled to an exhaust aftertreatment system; causing, by the controller, a speed of the engine to operate in an elevated condition; determining, by the controller, an enable condition for a nitrous oxide (NOx) monitor reset process; in response to the determined enable condition, receiving, by the controller, a system out NOx value; comparing, by the controller, the system out NOx value to an estimated NOx amount; and in response to the comparison, selectively diagnosing, by the controller, the exhaust aftertreatment system as one of a healthy and a degraded exhaust aftertreatment system.

Still another embodiment relates to a system. The system includes an engine; an exhaust aftertreatment system in exhaust gas communication with the engine; and a controller communicably and operatively coupled to the engine and the exhaust aftertreatment system. According to one embodiment, the controller is structured to: receive vehicle operation data indicative of a stationary condition for a vehicle having the engine and the exhaust aftertreatment system; determine an enable condition is satisfied for the engine and exhaust aftertreatment system; in response to the determined enable condition, receive system out nitrous oxide (NOx) data indicative of a NOx amount exiting the exhaust aftertreatment system; compare the system out NOx data to an estimated NOx amount; and in response to the comparison, selectively diagnose the exhaust aftertreatment system as one of a healthy and a degraded exhaust aftertreatment system.

These and other features, together with the organization and manner of operation thereof, will become apparent from the following detailed description when taken in conjunction with the accompanying drawings.

BRIEF DESCRIPTION OF THE DRAWINGS

FIG. 10 is a table summarizing the results of a NOx monitor reset process for a degraded exhaust aftertreatment system, according to an example embodiment.

FIG. 12 is a table depicting final timing as a function of engine speed and fueling during the NOx monitor reset process of FIG. 11, according to an example embodiment.

FIG. 13 is a table depicting rail pressure as a function of engine speed and fueling during the NOx monitor reset process of FIG. 11, according to an example embodiment.

FIG. 14 is a table depicting pilot fueling quantity as a function of engine speed and fueling during the NOx monitor reset process of FIG. 11, according to an example embodiment.

FIG. 15 is a table depicting pilot fueling timing as a function of engine speed and fueling during the NOx monitor reset process of FIG. 11, according to an example embodiment.

FIG. 16 is a table depicting post fueling quantity as a function of engine speed and fueling during the NOx monitor reset process of FIG. 11, according to an example embodiment.

FIG. 17 is a table depicting post fueling timing as a function of engine speed and fueling during the NOx monitor reset process of FIG. 11, according to an example embodiment.

DETAILED DESCRIPTION

Figure 1:
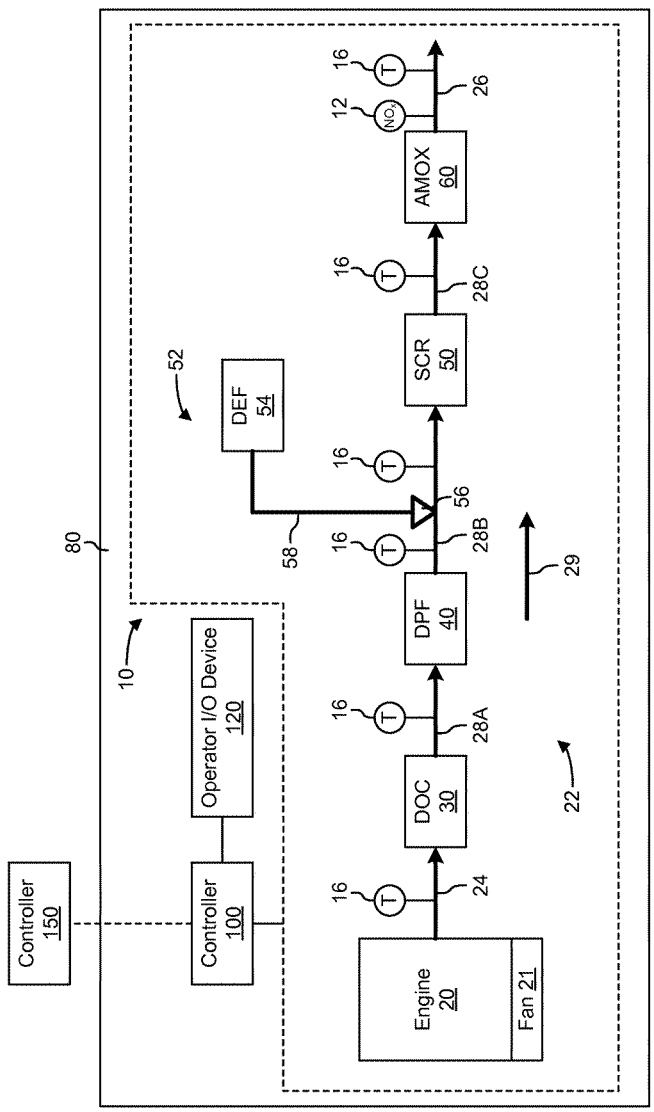
FIG. 1 is a schematic diagram of an exhaust aftertreatment system with a controller, according to an example embodiment.

Referring to the Figures generally, the various embodiments disclosed herein relate to systems, methods, and apparatuses for diagnosing an ability of an exhaust aftertreatment system to monitor nitrous oxide (NOx) emissions. As emissions regulations have strengthened, an importance of reducing emissions (e.g., NOx emissions, particulate matter emissions, carbon monoxide emissions, and the like) has increased. As an example and in regard to NOx emissions, currently Euro IV and Euro V regulations require NOx emissions to be continuously monitored and any deviation from regulated limits must or should be reported to the vehicle operator by lighting a malfunction indicator lamp (MIL). In some implementations, an engine torque derate condition may occur when a fault code remains active for a specific time without corrective action from the operator, and some faults may even cause an immediate torque derate condition. Before the derate condition and/or indicator lamp is disabled, a NOx reset test (also referred to as a NOx monitor reset test) may be utilized to ensure NOx emissions are at or below a predetermined acceptable threshold or able to be accurately or substantially accurately tracked and monitored (e.g., to ensure the detected amount of NOx emissions is substantially correct). However, conventional NOx reset tests are cumbersome; in particular, conventional NOx reset tests include loading the vehicle, driving the vehicle until an enable condition is met, and running the test. Driving is costly for users (e.g., fuel costs, diesel exhaust fluid costs, operator hours, down time, etc.) and there may be no fixed time for which the NOx monitor reset process is ran. According to the present disclosure, a system, method, and apparatus are provided that may facilitate a stationary NOx monitor reset process that eliminates or substantially eliminates the need to drive the vehicle to perform the reset diagnostic process.

According to the present disclosure, a controller may be communicably coupled to an exhaust aftertreatment system. The controller may be included in the vehicle or be communicably and operatively coupled to the engine and exhaust aftertreatment system as a separate component (e.g., as a service or technician tool). The controller may receive vehicle operation data regarding the vehicle and, in response, confirm that the vehicle is in a stationary condition. In response, the controller may cause ignition of the engine and monitor operation of the engine and aftertreatment system until an enable condition for the NOx monitor reset process (also referred to as a NOx monitor reset test) is detected. Upon detection, the controller may initiate the NOx reset diagnostic process. During the NOx reset diagnostic process, the controller may receive NOx data indicative of a NOx value exiting the aftertreatment system and compare the NOx value to an estimated or determined amount of NOx exiting the system. Responsive to the comparison, the controller may diagnose the aftertreatment system. For example, if the comparison indicates that the measured NOx value is greater than the estimated NOx amount by more than a predetermined threshold amount, the controller may determine that the aftertreatment system has not passed the test and not deactivate the indicator lamp and/or the triggered fault code. However, if the comparison indicates that the measured NOx value is within a predetermined amount of the estimated NOx amount, the controller may provide a PASS notification to the user/operator and deactivate the indicator lamp and fault code. Beneficially, the system, method, and apparatus of the present disclosure may facilitate NOx determinations in a stationary environment to reduce the need for an operator to actually drive the vehicle in order to perform the NOx monitor reset process. Technically and advantageously, such a process may increase the accuracy of the NOx determinations by allowing the process to be performed in a controlled environment (e.g., a service bay of a technician or service center) to reduce the likelihood of false positives and, in turn, reduce down time, appease users/operators, and several other benefits and advantages that are described more fully herein below.

As used herein, a passive diagnostic test (also referred to as a passive diagnostic process) refers to a diagnostic test or process that may be performed while the engine and exhaust aftertreatment system are operational. For example, if embodied in a vehicle, the passive test may be performed while the operator is driving the vehicle. If an error or fault is detected, a fault code or indicator lamp may be actuated to alert the operator of maintenance or service that may be required. In contrast, an intrusive test (also referred to as an intrusive diagnostic process, an intrusive process, and an intrusive diagnostic test) refers to an active diagnostic test that is forced to run on the engine and/or exhaust aftertreatment system (i.e., causes the engine to operate at a certain speed, causes temperatures in the aftertreatment system to reach a certain or predefined threshold, etc.). In this regard, an "intrusive diagnostic test" may include overriding various set engine operating points to perform the diagnostic test. For example, many engine operating points are set to be in compliance with one or more vehicular laws (e.g., emissions, etc.). By overriding one or more of these operating points, the engine may be forced into non-compliance with one or more vehicular laws. As a result, the intrusive diagnostic test is often run in a service bay, test center environment, or other controlled environment.

Referring now to FIG. 1, an engine-exhaust aftertreatment system with a controller is shown, according to an example embodiment. According to one embodiment, the engine system 10 is embodied within a vehicle 80. The vehicle 80 may be any type of on-road or off-road vehicle including, but not limited to, line-haul trucks, mid-range trucks (e.g., pick-up trucks), cars, boats, tanks, airplanes, and any other type of vehicle that utilizes an exhaust aftertreatment system. In various alternate embodiments, engine system 10 may be embodied in a stationary application (e.g., a non-vehicle application such as a power generation system). All such variations are intended to fall within the scope of the present disclosure.

The engine system 10 includes an internal combustion engine 20 and an exhaust aftertreatment system 22 in exhaust gas-receiving communication with the engine 20. According to one embodiment, the engine 20 is structured as a compression-ignition internal combustion engine that utilizes diesel fuel. However, in various alternate embodiments, the engine 20 may be structured as any other type of engine (e.g., spark-ignition) that utilizes any type of fuel (e.g., gasoline). Within the internal combustion engine 20, air from the atmosphere is combined with fuel, and combusted, to power the engine. Combustion of the fuel and air in the compression chambers of the engine 20 produces exhaust gas that is operatively vented to an exhaust manifold and to the exhaust aftertreatment system 22. Combustion may cause an increase in temperatures in the engine 20 and produce elevated temperatures. As a result, a cooling system may be operatively and fluidly coupled to the engine 20. The cooling system may include any components included in cooling systems (e.g., coolant tank, pump, thermostat, radiator or other heat exchanger, piping or conduit, and so on), such as the fan 21. The fan 21 may be operatively coupled to the engine 20 and structured to selectively activate to cool the engine 20. The fan 21 may be any type of fan included in automotive cooling systems, such as a mechanically-driven fan or an electrically-driven fan.

In the example depicted, the exhaust aftertreatment system 22 includes a diesel particular filter (DPF) 40, a diesel oxidation catalyst (DOC) 30, a selective catalytic reduction (SCR) system 52 with a SCR catalyst 50, and an ammonia oxidation (AMOx) catalyst 60. The SCR system 52 further includes a reductant delivery system that has a diesel exhaust fluid (DEF) source 54 that supplies DEF to a DEF doser 56 via a DEF line 58.

In an exhaust flow direction, as indicated by directional arrow 29, exhaust gas flows from the engine 20 into inlet piping 24 of the exhaust aftertreatment system 22. From the inlet piping 24, the exhaust gas flows into the DOC 30 and exits the DOC into a first section of exhaust piping 28A. From the first section of exhaust piping 28A, the exhaust gas flows into the DPF 40 and exits the DPF into a second section of exhaust piping 28B. From the second section of exhaust piping 28B, the exhaust gas flows into the SCR catalyst 50 and exits the SCR catalyst into the third section of exhaust piping 28C. As the exhaust gas flows through the second section of exhaust piping 28B, it is periodically dosed with DEF by the DEF doser 56. Accordingly, the second section of exhaust piping 28B acts as a decomposition chamber or tube to facilitate the decomposition of the DEF to ammonia. From the third section of exhaust piping 28C, the exhaust gas flows into the AMOx catalyst 60 and exits the AMOx catalyst into outlet piping 26 before the exhaust gas is expelled from the exhaust aftertreatment system 22. Based on the foregoing, in the illustrated embodiment, the DOC 30 is positioned upstream of the DPF 40 and the SCR catalyst 50, and the SCR catalyst 50 is positioned downstream of the DPF 40 and upstream of the AMOx catalyst 60. However, in alternative embodiments, other arrangements of the components of the exhaust aftertreatment system 22 are also possible The DOC 30 may have any of various flow-through designs. Generally, the DOC 30 is structured to oxidize at least some particulate matter, e.g., the soluble organic fraction of soot, in the exhaust and reduce unburned hydrocarbons and CO in the exhaust to less environmentally harmful compounds. For example, the DOC 30 may be structured to decrease the hydrocarbon and CO concentrations in the exhaust to meet the requisite emissions standards for those components of the exhaust gas.

In addition to treating the hydrocarbon and CO concentrations in the exhaust gas, the DOC 30 may also be used in the controlled regeneration of the DPF 40, SCR catalyst 50, and AMOx catalyst 60. This can be accomplished through the injection, or dosing, of unburned HC into the exhaust gas upstream of the DOC 30. Upon contact with the DOC 30, the unburned HC undergoes an exothermic oxidation reaction which leads to an increase in the temperature of the exhaust gas exiting the DOC 30 and subsequently entering the DPF 40, SCR catalyst 50, and/or the AMOx catalyst 60. The amount of unburned HC added to the exhaust gas is selected to achieve the desired temperature increase or target controlled regeneration temperature.

The DPF 40 may be any of various flow-through or wall-flow designs, and is structured to decrease particulate matter concentrations, e.g., soot and ash, in the exhaust gas to meet or substantially meet requisite emission standards. The DPF 40 captures particulate matter and other constituents, and thus may need to be periodically regenerated to burn off the captured constituents. According to one embodiment, the DPF 40 may be catalyzed. In turn, the DPF 40 may be configured to oxidize the particulate matter (e.g., soot) entrapped by the filter to form $NO_2$ independent of the DOC 30. The catalyst may be structured as any type of catalyst included with a DPF, such as platinum.

As discussed above, the SCR system 52 may include a reductant delivery system with a reductant (e.g., DEF) source 54, a pump and a delivery mechanism or doser 56. The reductant source 54 can be a container or tank capable of retaining a reductant, such as, for example, ammonia ($NH_3$), DEF (e.g., urea), or diesel oil. The reductant source 54 is in reductant supplying communication with the pump, which is configured to pump reductant from the reductant source to the delivery mechanism 56 via a reductant delivery line 58. The delivery mechanism 56 is positioned upstream of the SCR catalyst 50. The delivery mechanism 56 is selectively controllable to inject reductant directly into the exhaust gas stream prior to entering the SCR catalyst 50. As described herein, the controller 100 and/or the controller 150 is structured to control the timing and amount of the reductant delivered to the exhaust gas. In some embodiments, the reductant may either be ammonia or DEF, which decomposes to produce ammonia. The ammonia reacts with NOx in the presence of the SCR catalyst 50 to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst in the presence of $NH_3$.

The SCR catalyst 50 may be any of various catalysts known in the art. For example, in some implementations, the SCR catalyst 50 is a vanadium-based catalyst, and in other implementations, the SCR catalyst is a zeolite-based catalyst, such as a Cu-Zeolite or a Fe-Zeolite catalyst.

The AMOx catalyst 60 may be any of various flow-through catalysts configured to react with ammonia to produce mainly nitrogen. The AMOx catalyst 60 is structured to remove ammonia that has slipped through or exited the SCR catalyst 50 without reacting with NOx in the exhaust. In certain instances, the exhaust aftertreatment system 22 may be operable with or without an AMOx catalyst. Further, although the AMOx catalyst 60 is shown as a separate unit from the SCR catalyst 50 in FIG. 1, in some implementations, the AMOx catalyst may be integrated with the SCR catalyst, e.g., the AMOx catalyst and the SCR catalyst can be located within the same housing.

The exhaust aftertreatment system 22 is shown to also include various sensors, such as a NOx sensor 12 and temperature sensors 16, which may be strategically disposed throughout the exhaust aftertreatment system 22 and may be in communication with the controller 100 and/or controller 150 to monitor various operating conditions of the exhaust aftertreatment system 22. As shown, multiple temperature sensors 16 are included in the system 22. However, in other embodiments, more or less temperature sensors 16 may be included with the system. In the example depicted, a pair of temperature sensors 16 are associated with the DOC 30 and DPF 40, and thus may be referred to as the DOC/DPF temperature sensors 16. The DOC/DPF temperature sensors are strategically positioned to detect the temperature of exhaust gas flowing into the DOC 30, out of the DOC and into the DPF 40, and out of the DPF before being dosed with DEF by the doser 56. Another pair of temperature sensors 16 are associated with the SCR catalyst 50 and thus may be referred to as the SCR temperature sensors. The SCR temperature sensors 16 are strategically positioned to detect the temperature of exhaust gas flowing into the SCR catalyst 50, out of the SCR catalyst 50, into the AMOx catalyst 60. In this regard, the SCR temperature sensors 16 may monitor a temperature of the SCR catalyst 50.

As shown, only one NOx sensor 12 is included with the system 22. However, in other embodiments, more than one NOx sensor may be included with the system 22, wherein each one of the more than one NOx sensor may be strategically positioned within the system. In this example configuration, the NOx sensor 12 is positioned at or near the end of the system 22, such that the NOx sensor may monitor, measure, or otherwise acquire data indicative of NOx amount or value exiting the system 22. The NOx sensor 12 may have any type of structure typically used with NOx sensors.

It should be understood that the aftertreatment system 22 may include more, less, additional, or different sensors than those depicted in FIG. 1. For example, some configurations may include a particulate matter (PM) sensor, wherein the PM sensor is structured to acquire data indicative of the amount of particulate matter (e.g., soot, ash, unburnt hydrocarbons) at or near the location of the PM sensor. In another arrangement, a $NH_3$ sensor may be included with the system 22, wherein the $NH_3$ sensor is structured to acquire data indicative of an amount of ammonia at or near the $NH_3$ sensor location. In yet another configuration, oxygen, flow, and pressure sensors may also be strategically disposed within the system 22. In still yet another configuration, the system 22 may include a reductant sensor(s). The reductant sensor(s) may be structured to acquire reductant data indicative of an amount of reductant within the exhaust gas (e.g., upstream of the SCR catalyst 50, downstream of the SCR catalyst 50, downstream of the AMOx 60, etc.). By way of example, the reductant sensor(s) may be strategically positioned before and/or after any component within the engine system 10 (e.g., the doser 56, the SCR catalyst 50, the AMOx catalyst 60, etc.) such that the amount of reductant within the exhaust gas flowing into and out of any component may be detected and communicably transmitted to the controller 150 or controller 100. Accordingly, the type, amount, and location of the sensors in FIG. 1 is not meant to be limiting.

Further, in some embodiments, a virtual sensor may be included with the engine system 10 and/or exhaust aftertreatment system 22. The virtual sensor may determine, estimate, and/or predict a value (e.g., an amount, a rate, etc.) relating to operation of the engine system 10 and/or aftertreatment system 22. For example, a virtual sensor may be used to estimate an engine out NOx amount or a system out NOx amount based on data relating to an engine speed, an engine power output, a fuel injection amount/rate, a combustion temperature, and the like. The determination may utilize a look-up table that correlates various operating conditions with expected NOx amounts, which can be based on data determined during testing. The determination may also utilize any of a model, formula, equation, process, and the like to otherwise determine a NOx amount at a various location without the use of a physical sensor. This embodiment may be beneficial in exhaust aftertreatment system architectures that are positioned in rather tight spaces, such that the electrical circuitry otherwise used to power and establish a communication protocol with the physical sensors may be eliminated. Further, this embodiment may be beneficial from the standpoint that the need to replace faulty sensors may be substantially avoided. In turn, an operator may realize a rather higher uptime for the system than downtime (e.g., in a repair shop, etc.).

It should be understood that the arrangement of the exhaust aftertreatment system 22 in FIG. 1 is illustrative only. Other configurations may include more or less components and in different positions than the components depicted in FIG. 1. The innovations of the present disclosure are intended to be widely applicable, such that other exhaust aftertreatment system configurations are intended to fall within the spirit and scope of the present disclosure.

FIG. 1 is also shown to include an operator input/output (I/O) device 120. The operator I/O device 120 is communicably coupled to the controller 150 and/or controller 100, such that information, data, instructions, values, commands, etc. may be exchanged between the controllers 100, 150 and the operator I/O device 120, wherein the information may relate to one or more components of FIG. 1 or determinations (described below) of the controller 150. The operator I/O device 120 enables an operator of the engine system 10 to communicate with the controllers 100, 150 and one or more components of the engine system 10 of FIG. 1. For example, the operator input/output device 120 may include, but is not limited to, an interactive display, a touchscreen device, one or more buttons and switches, voice command receivers, etc. In various alternate embodiments, the controller 150 and components described herein may be implemented with non-vehicular applications (e.g., a power generator, etc.). Accordingly, the I/O device may be specific to those applications. For example, in those instances, the I/O device may include a laptop computer, a tablet computer, a desktop computer, a phone, a watch, a personal digital assistant, etc. Via the operator I/O device 120, the controller 150 or controller 100 may provide a fault or service notification based on the NOx monitor reset process described herein.

The controller 100 may be structured to control operation of the engine system 10 and associated sub-systems, such as the internal combustion engine 20 and the exhaust aftertreatment system 22. According to one embodiment, the components of FIG. 1 are embodied in a vehicle except for the controller 150. Communication between and among the components of the engine system 10 and aftertreatment system 22 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, Zigbee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The controller 100 may include any type of controller or control unit, such an electronic control unit (ECU), included in automotive applications. The ECU may include a transmission control unit and any other vehicle control unit (e.g., exhaust aftertreatment control unit, powertrain control circuit, engine control circuit, etc.).

In some embodiments, the controller 100 may include the controller 150, such that the controller 100 may facilitate the processes described herein in regard to the controller 150. Accordingly, the controller 100 may include the structure and function of the controller 150 as shown and described in regard to FIG. 2. However, in the example depicted, the controller 150 is a separate component relative to the controller 100. Accordingly, in this embodiment, the controller 150 may be embodied in or as a service or technician tool. The controller 150 may operatively and communicably couple to the controller 100 (and/or other components of the engine system 10 and aftertreatment system 22). In another embodiment, the controller 150 may be embodied as an application (e.g., a web or server based application) that may be downloaded to the controller 100 for use. In yet another embodiment, the controller 150 may be embodied as a remote computing device (e.g., a computer) that may be communicably and operatively coupled to the controller 100 (and/or other components of the engine system 10 and aftertreatment system 22). In this example, the NOx monitor reset process of the present disclosure may be remotely activated. Such a configuration may be advantageous for vehicle operators who have a period of downtime (e.g., a truck driver at a truck stop), but are not near a service location. In this case, the NOx monitor reset process may still be performed.

As mentioned above, in some embodiments, the controller 100 may include the controller 150 while in other embodiments, the controllers 100 and 150 are separate. In each configuration, the controller 100 may include any type of memory and processing components for facilitating monitoring and otherwise controlling one or more components in the engine 10 and aftertreatment system 22. The controller 100 may include communication circuitry, one or more circuits that actuate or instruct a component how to perform (e.g., control dosing in the aftertreatment system 22, define the frequency of acquisition of NOx data, and so on), machine-readable content, and any combination therewith. Accordingly, while the structure and function of the controller 150 are shown and described herein, it should be understood that the same or similar structure and function may be embodied with the controller 100. Such structure and function may be present in the controller 100 even in embodiments where the controller 150 is a separate component relative to the controller 100. Accordingly, the function and structure of the controller 100, in combination with the controller 150, is meant to be broadly interpreted.

Figure 2:
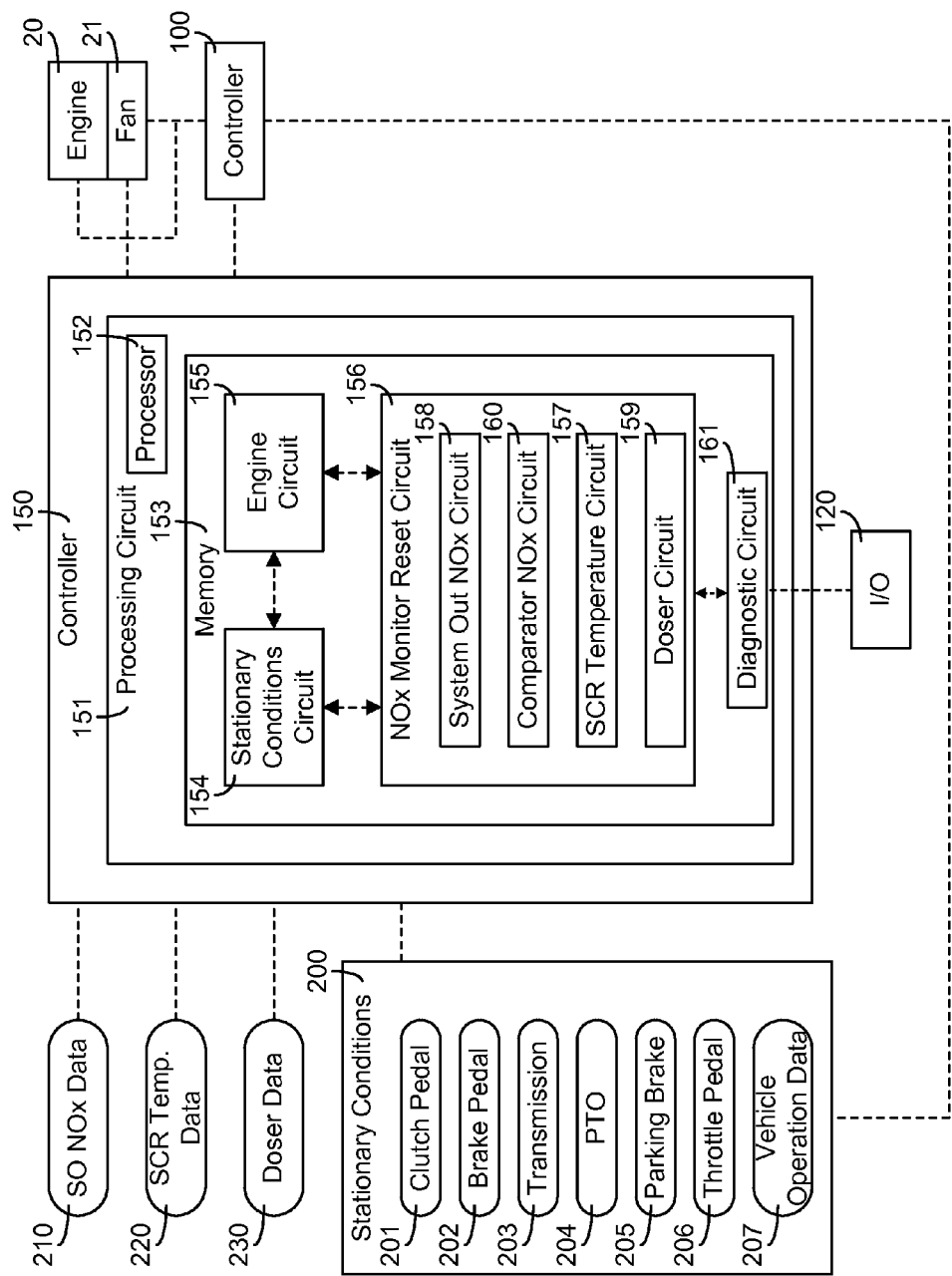
FIG. 2 is a schematic diagram of the controller used with the system of FIG. 1, according to an example embodiment.

As such, referring now to FIG. 2, an example structure for the controller 150 is shown according to one embodiment. As shown, the controller 150 includes a processing circuit 151 including a processor 152 and a memory 153. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 153 (e.g., RAM, NVRAM, ROM, Flash Memory, hard disk storage, etc.) may store data and/or computer code for facilitating the various processes described herein. Thus, the one or more memory devices 153 may be communicably connected to the processor 152 and provide computer code or instructions to the processor 152 for executing the processes described in regard to the controller 150 herein. Moreover, the one or more memory devices 153 may be or include tangible, non-transient volatile memory or non-volatile memory. Accordingly, the one or more memory devices 153 may include database components, object code components, script components, or any other type of information structure for supporting the various activities and information structures described herein.

The memory 153 is shown to include various circuits for completing the activities described herein. More particularly, the memory 153 includes a stationary conditions circuit 154, an engine circuit 155, a NOx monitor reset circuit 156 comprising a SCR temperature circuit 157, a system out NOx circuit 158, a doser circuit 159, and a comparator NOx circuit 160. The memory 153 is further shown to include a diagnostic circuit 161. The circuits 154-161 may be structured to cause and verify a stationary condition for the vehicle, determine an enable condition is met to perform a NOx monitor reset process, and selectively cause activation/deactivation of an indicator lamp, fault code, a derate condition, and various other actions responsive to the determination of the NOx monitor reset process. While various circuits with particular functionality are shown in FIG. 2, it should be understood that the controller 150 and memory 153 may include any number of circuits for completing the functions described herein. For example, the activities of multiple circuits may be combined as a single circuit, additional circuits with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The stationary conditions circuit 154 may be structured to interpret vehicle operation data and, in response, determine a stationary condition is satisfied for the vehicle. As used herein and in regard to the determined "stationary condition" by the stationary conditions circuit 154, the stationary condition refers to vehicle operation data indicative of a stationary condition sufficient for subsequent performance of a NOx monitor reset process. Accordingly, a "stationary condition" may generally refer to conditions indicative of a non-moving vehicle and may include any one or more of the conditions described below.

In one embodiment and when the controller 150 is included in the vehicle 80 (e.g., either with controller 100 or as a separate component in the vehicle 80), the stationary conditions circuit may include various components of the engine system 10 and aftertreatment system 22, such as a clutch pedal, brake pedal, transmission, power take-off (PTO), parking brake, and throttle pedal. In this regard, the stationary conditions circuit 154 may monitor any one or more of the aforementioned components to determine if a stationary condition is satisfied. In still another embodiment and when the controller 150 is either included with the controller 100 or as a separate component in the vehicle 80, the stationary conditions circuit 154 may include one or more sensors, such as a clutch pedal position sensor for acquiring clutch pedal data 201, a brake pedal position sensor for acquiring brake pedal data 202, a transmission sensor for acquiring transmission data 203 (for, e.g., monitoring a position of the transmission), a parking brake sensor for acquiring parking brake data 205, and a throttle pedal position sensor for acquiring throttle pedal data 206, wherein the position sensors may acquire data indicative of a position of the aforementioned components (e.g., a position of the clutch pedal, a position of the parking brake, etc.). In another embodiment and when the controller 150 is separate from the vehicle 80 or included with the vehicle 80 as a part of or separate from the controller 100, the stationary conditions circuit 154 may include communication circuitry including, but not limited to, wired and wireless communication protocol to facilitate reception of a value, data, or information relating to one or more of the aforementioned components. In yet still another embodiment and when the controller 150 is separate from the vehicle 80 or included with the vehicle 80 as a part of or separate from the controller 100, the stationary conditions circuit 154 may include machine-readable media stored by the memory 153 and executable by the processor 151, wherein the machine-readable media facilitates performance of certain operations to receive a value or information indicative of a stationary condition for the vehicle 80. For example, the machine-readable media may provide an instruction (e.g., command, etc.) to a throttle pedal position sensor coupled to the throttle pedal to monitor and acquire data indicative of a position of the throttle pedal. In this regard, the machine-readable media may include programmable logic that defines the frequency of acquisition of when the data is acquired, tracked, or otherwise received. In a further embodiment, the stationary conditions circuit 154 may include any combination of machine-readable content, communication circuitry, and the aforementioned components.

Based on the foregoing, the stationary conditions circuit 154 may receive vehicle operation data including, but not limited to, clutch pedal data 201, brake pedal data 202, transmission data 203, PTO data 204, parking brake data 205, throttle pedal data 206, and other vehicle operation data 207. In response to the component data 200, the stationary conditions circuit 154 may determine that the vehicle 80 is in a stationary condition and, more particularly, a stationary condition suitable for execution of the NOx monitor reset diagnostic test. As mentioned above, a "stationary condition" refers to an operating condition of the vehicle that is sufficient for enabling the NOx monitor reset diagnostic test. Accordingly, the "stationary condition" may include information indicating any one or more of the following: the clutch pedal data 201 may indicate that the clutch pedal is released (i.e., not depressed, such that a shift event in the transmission is substantially prevented), the brake pedal data 202 may indicate the brake pedal is released (i.e., the brake pedal is not depressed, such that no or substantially no brake action is present), the transmission data 203 may indicate that the transmission is set in either neutral or park (indicative that the vehicle is not moving), the PTO data 204 may indicate that the PTO is turned off (e.g., power from the engine is not being transmitted to a component within the vehicle 80 or outside of the vehicle 80), the vehicle operation data 207 may indicate that a vehicle 80 speed is zero, parking brake data 205 may indicate that the parking brake is ON or actuated, and throttle pedal data 206 may indicate that the throttle pedal is released (i.e., that fueling is not being commanded from the engine to accelerate the engine and vehicle 80). According to one embodiment, all of the aforementioned stationary conditions are required before the stationary conditions circuit 154 determines that a stationary condition exists. According to another embodiment, only one of the aforementioned stationary conditions are required before the stationary conditions circuit 154 determines that a stationary condition exists. According to still another embodiment, any predefined combination of the aforementioned stationary conditions are required before the stationary conditions circuit 154 determines that a stationary condition exists. Accordingly, as will be appreciated by those of ordinary skill in the art, by using one or more of the aforementioned conditions, the controller 150 may account for differences in vehicle configuration (e.g., a vehicle without a clutch pedal) to still identify and recognize sufficient stationary condition(s) for the NOx monitor reset process or process.

The engine circuit 155 may be structured to control operation of the engine 20 (e.g., cause ignition of the engine, etc.). Accordingly, in one embodiment and when the engine circuit 155 is embodied with the controller 100 or as a separate component in the vehicle 80 in the controller 150, the engine circuit 155 may include the engine 20 itself. In another embodiment, the engine circuit 155 may include one or more sensors operatively and communicably coupled to the engine 20, such as an engine speed sensor, an engine torque sensor, etc. In this regard, the engine circuit 155 may monitor operation of the engine 20. In yet another embodiment, the engine circuit 155 may include or be communicably coupled to a controller for the engine 20 (such as controller 100) to facilitate operational control over the engine 20 as well as receiving information indicative of operation of the engine 20. In still another embodiment, the engine circuit 155 may include any type of communication circuitry (e.g., wired or wireless protocols) for facilitating the exchange of information, instructions, data, and values between the controller 150 and the engine 20. In yet a further embodiment, the engine circuit 155 may include machine-readable media stored by the memory 153 and executable by the processor 151, wherein the machine-readable media facilitates performance of certain operations to facilitate monitoring and management of operation of the engine 20. For example, the machine-readable media may provide an instruction (e.g., command, etc.) to an engine speed sensor coupled to the engine 20 to acquire data indicative of a speed of the engine 20. In this regard, the machine-readable media may include programmable logic that defines the frequency of acquisition of when the data is acquired, tracked, or otherwise received. In a further embodiment, the engine circuit 155 may include any combination of machine-readable content, communication circuitry, and the other aforementioned components (e.g., the engine 20 itself and/or various sensors of the engine 20).

According to one embodiment, the engine circuit 155 may be structured to control operation of the engine 20 in response the stationary condition being satisfied as determined by the stationary conditions circuit 154. Control of the engine 20 may include starting the engine 20 (e.g., causing ignition by completing the ignition circuit). Such ignition may be independent of a user/operator providing an explicit ignition instruction (e.g., turning a key) or be dependent upon a user/operator providing the explicit instruction. Control of the engine 20 may include causing the engine 20 to reach a predetermined engine speed threshold or range used for the NOx monitor reset process. As described herein, control of the engine 20 may include operating the engine 20 at an elevated operating mode. The elevated operating mode may include operating the engine 20 at a an elevated speed. The elevated speed may be engine-specific and correspond with any speed considered as elevated by those of ordinary skill in the art. For example, an elevated speed range may correspond with 1800 revolutions-per-minute (RPM) to 2100 RPM and anything above 2100 RPM. Other configurations may use different demarcations for conditions indicative of an elevated speed range for the engine 20. Control of the engine 20 may further include controlling how long the engine 20 operates at a certain condition (e.g., at 2100 RPM for three minutes followed by 2200 RPM for four minutes, etc.). In this regard and due to the explicit control of the engine 20, the NOx monitor reset process of the present disclosure may represent or be structured as an intrusive diagnostic test or process.

The engine circuit 155 may also include the fan 21 or include communication circuitry operatively and communicably coupling the engine circuit 155 to the fan 21. Accordingly, the engine circuit 155 may provide data, instructions, commands, and the like to the fan 21 to control operation of the fan 21. In one embodiment and as described more fully herein below, after a predefined duration of operation of the engine 20, the engine circuit 155 may activate the fan 21. According to one embodiment, the fan 21 may be commanded by the circuit 155 to operate throughout the NOx monitor reset process. According to another embodiment, the fan 21 may be commanded by the circuit 155 to selectively activate and deactivate during the NOx monitor reset process.

The NOx monitor reset circuit 156 may be structured to cause performance of a NOx monitor reset process to observe, monitor, and otherwise diagnose the aftertreatment system 22 based on the ability of the aftertreatment system 22 to manage NOx emissions (e.g., track NOx emissions, reduce NOx emissions, etc.). In this regard, the diagnosis may be based on at least one of the ability of the aftertreatment system 22 to reduce NOx emissions to a predefined standard by accurately or substantially accurately being able to track NOx emissions from the engine system 10 and aftertreatment system 22. In this regard, the NOx monitor reset circuit 156 includes an SCR temperature circuit 157, a system out NOx circuit 158, a doser circuit 159, and a comparator NOx circuit 160.

In one embodiment, the NOx monitor reset circuit 156 includes NOx sensor 12, such that the NOx monitor reset circuit 156 may receive NOx data 210 from the sensor 12. In another embodiment, the NOx monitor reset circuit 156 includes communication circuitry for facilitating the exchange of data, values, or information between one or more components in the system 22 and the circuit 156. In yet another embodiment, the NOx monitor reset circuit 156 includes machine-readable media stored by the memory 153 and executable by the processor 151, wherein the machine-readable media facilitates performance of certain operations to facilitate performance of the NOx monitor reset process. In yet another embodiment, the NOx monitor reset circuit 156 may include any combination of machine-readable content and the aforementioned components (e.g., the NOx sensor 12).

More particularly and as described below, in response to the stationary condition, the NOx monitor reset circuit 156 may detect an enable condition for a NOx monitor reset process and cause analysis of the NOx emissions from the system 22 to determine the efficacy of the aftertreatment system 22. The "enable condition" may refer to one or more operating conditions of the vehicle that indicate an operating condition of the engine and/or exhaust aftertreatment system that facilitates the remainder of the NOx monitor reset process. Accordingly, because NOx formation is typically most prevalent at high exhaust temperatures, the enable condition may be based on operating conditions indicative of high exhaust gas temperatures. As described below, one such enable condition may be a temperature at or near the SCR catalyst 50.

Referring now to the SCR temperature circuit 157, the SCR temperature circuit 157 may be structured to receive SCR temperature data 220 indicative of a temperature of the SCR catalyst 50. Accordingly, the SCR temperature circuit 157 may include or be communicably coupled with a temperature sensor (such as temperature sensor 16) disposed in thermal communication with the SCR catalyst 50. The temperature data may be received continuously or in a predefined periodic rate (e.g., every thirty-seconds, etc.). Similar to the system out NOx circuit 158, one or more predefined settings may be used to define how often the SCR temperature circuit 157 receives or interprets SCR temperature data 220.

As described above, according to one embodiment, the SCR temperature data 220 may be used to determine an enable condition for the NOx monitor reset process. In this regard, a SCR temperature at or above a predefined threshold or within a predefined range may be used to trigger the running or performance of the remainder of the NOx monitor reset process (e.g., an enable condition). The predefined threshold may be any temperature indicative of an activation of the SCR catalyst 50 (e.g., at high temperatures where NOx formation is relatively more prevalent, the SCR catalyst may be relied upon to reduce the NOx emissions amount). Accordingly, the predefined threshold or range may be a specific temperature or temperature range of the SCR catalyst 50 or any other temperature or operating condition of the exhaust aftertreatment system that may be indicative of an elevated SCR catalyst 50 temperature (e.g., a relatively high exhaust gas flow rate, a temperature of another component such as the DOC, etc.). For example, in one embodiment, an SCR catalyst 50 temperature between 200 degrees Celsius and 400 degrees Celsius may be defined as the enable condition for the NOx monitor reset process. In another embodiment, a different temperature range indicative of an elevated SCR temperature range may be used as an enable condition.

According to other embodiments, other enable conditions may be used to trigger the NOx monitor reset process to analyze the NOx emissions from the system 22. As an example, one other enable condition may be a temperature of an exhaust gas flow rate. For example, a temperature range between 200 degrees Celsius and 400 degrees Celsius for exhaust gas may be defined as an enable condition for the NOx monitor reset process. As another example, another enable condition may be an exhaust gas flow rate above a certain threshold or in a predefined ranged, which is indicative of a high or elevated operating mode (e.g., between 200 grams/second and 800 grams/second). As still another example, another enable condition may be an elevated engine speed (e.g., between 1800 RPM and 2100 RPM). In some embodiments, one or more enable conditions may be used in combination to trigger the remainder of the NOx monitor reset process. In other embodiments, only one enable condition may be used to trigger the remainder of the NOx monitor reset process. All such variations are intended to fall within the scope of the present disclosure.

According to one embodiment, to cause the relatively elevated temperatures in the exhaust aftertreatment system, the engine circuit 155 may cause an engine cylinder cutout mode. During the engine cylinder cutout mode, only some of the cylinders are operational. For example, a three-cylinder cutout mode may correspond with only three cylinders (out of the remaining number of cylinders, such as six) being used to power the engine 20. By utilizing a cylinder cutout mode, the engine 20 may produce relatively higher exhaust gas temperatures, which in turn heat up the exhaust gas temperatures in the aftertreatment system 22 and, consequently, the SCR catalyst.

In response to the enable condition, the system out NOx circuit 158 may be structured to receive (in some embodiments, acquire based on the circuit 158 including the sensor 12 itself) NOx data 210 indicative of a NOx amount leaving or exiting the system 22. The system out NOx circuit 158 may receive NOx data continuously or periodically during the NOx monitor reset process. In this regard, one or more predefined settings may be used to define how often the system out NOx circuit 158 receives or interprets NOx data 210.

The doser circuit 159 may be structured to control the doser 56 and monitor operation regarding the doser 56. More particularly, during the NOx monitor reset process, the doser circuit 159 may be structured to provide a relatively constant dosing command to facilitate accurate or relatively accurate determinations (see, e.g., FIGS. 4-10). Accordingly, the doser circuit 159 may include the doser 56 and/or communication circuitry for facilitating control and receiving information indicative thereof, such as doser data 230. The doser circuit 159 may track, store, and monitor data regarding the dosing system including, but not limited, a dosing rate and amount at predefined intervals, which may represent the doser data 230. Similar to the system out NOx circuit 158 and the SCR temperature circuit 157, one or more predefined settings may be used to define how often the doser circuit 159 receives or interprets doser data 230.

The comparator NOx circuit 160 may be structured to determine an estimated NOx value out of the system 22, compare the estimated NOx value out of the system 22 to the measured NOx value from the system out NOx circuit 158, and in response to the comparison, diagnose the system 22. In one embodiment, the comparator NOx circuit 160 may perform the aforementioned operations in response to the enable condition being detected (described above). The diagnosis may be provided to the diagnostic circuit 161, wherein the diagnostic circuit 161 may take one or more of the actions described herein below. In one embodiment, the comparator NOx circuit 160 may include a virtual NOx sensor, wherein the virtual NOx sensor may be positioned at any desired position in the system 22. The virtual NOx sensor may include one or more formulas, processes, models, algorithms, and the like that facilitate the determination and/or estimation of a system out NOx value. In this configuration and advantageously, the diagnostic circuit 161 may provide a diagnosis of the system 22 using only one NOx sensor 12. In another embodiment, the system 22 may include additional NOx sensors, wherein the additional NOx sensors may be included with the comparator NOx circuit 160. In this arrangement, using data from the additional NOx sensors, the comparator NOx circuit 160 may determine or estimate a system out NOx amount to compare to the system out NOx value from the circuit 158. In still another embodiment, the comparator NOx circuit 160 may include machine-readable media stored by the memory 153 and executable by the processor 151, wherein the machine-readable media facilitates determination and/or estimation of a system out NOx value. In yet another embodiment, the comparator NOx circuit 160 may include any combination of machine-readable content and the aforementioned components (e.g., additional NOx sensors).

According to one embodiment, the comparator NOx circuit 160 determines whether the system 22 is healthy based on the measured NOx being within a predefined range of the estimated NOx out of the system 22. As used herein, the term "healthy" in regard to the system 22 refers to the aftertreatment system's ability to at least one of accurately or substantially accurately track NOx emissions out of the system 22 and maintain NOx emissions from the system at or below a predefined threshold (or within a predefined range, etc.). Comparatively and as used herein, a "degraded" or "not healthy" system refers to at least one the aftertreatment system's inability to at least one of accurately or substantially accurately track NOx emissions out of the system 22 and maintain NOx emissions from the system at or below a predefined threshold (or within a predefined range, etc.). The acceptable predefined range is meant to be broadly interpreted by those of ordinary skill in the art. The acceptable predefined range can be plus-or-minus some value (e.g., 5 parts-per-million) relative to the estimated NOx value, wherein determined values outside of this range cause the NOx circuit 160 to not issue a PASS command (the PASS command refers to a determined healthy system whereas a FAIL command refers to a determined not healthy system). According to still another embodiment, another process of diagnosing an exhaust aftertreatment system is by analyzing an SCR efficiency. For example, because an engine out NOx value is known and is a dosing value, the controller 150 may determine a conversion efficiency for the SCR system by determining how much ammonia is neutralizing the NOx out of the engine. Based on one or more predefined standards, the determined conversion efficiency may be indicative of a PASS or a FAIL condition (e.g., due to the current engine operating condition, the SCR may be capable of 90% NOx reduction, but if it is determined to be at only 70%, the controller 150 may determine that the SCR is degraded). Use of the aforementioned SCR conversion efficiency process may be used by the controller 150 alone or in combination with the other-described (or any other) process for determining whether the exhaust aftertreatment system is healthy or degraded.

The diagnostic circuit 161 may be structured to receive the comparison determination from the comparator NOx circuit 160 and, in response, cause an indication of the results of the NOx monitor reset process. Accordingly, in one embodiment, the diagnostic circuit 161 may include the operator I/O device 120, when the controller 150 is embodied in the vehicle 80 (e.g., with controller 100 or as a separate component relative to controller 100). In another embodiment, the diagnostic circuit 161 may include any type of communication circuitry for providing the exchanging of information between an indication device (e.g., the I/O device 120 or as a readout when the controller 150 is embodied with or in a service tool) and the circuit 161. In still another embodiment, the diagnostic circuit 161 may include machine-readable media that may be stored by the memory and executable by the processor for causing the actions of the diagnostic circuit 161. In yet another embodiment, the diagnostic circuit 161 may include any combination of communication circuitry and machine-readable media.

In one embodiment, the diagnostic circuit 161 may selectively activate/deactivate an indicator lamp in response to the comparison. For example, in the event of a passing situation, the diagnostic circuit may deactivate a fault code and/or the indicator lamp (e.g., a check engine light). In the event of a non-passing situation, the diagnostic circuit 161 may activate or maintain activation of the indicator lamp and/or fault code. For example, a typical fault code may be FC 2772/2773, which is based on an expected NOx reduction. If the expected NOx reduction value is above a predefined normal or typical operation level by more than a predefined amount (i.e., NOx emissions are greater than expected), the FC2772 and/or FC 2773 may be triggered. In this regard, the FC 2773 may be indicative of a relatively more critical condition than the FC2772 code, whereby triggering of the FC 2773 is indicative of NOx reduction being above the predefined normal level by more than a threshold amount where that threshold amount is greater than the threshold amount for triggering the FC 2772 code. The NOx reduction may be a non-linear function of exhaust flow, SCR temperature, $NH_3$ dosing rate, and engine out NOx rate. High and low SCR catalyst temperature may cause un-desired chemical reactions that cause the $NH_3$ to react very slowly with NOx or, in other instances, the $NH_3$ may react with oxygen instead of NOx. Due to this characteristic, high/low exhaust flow and high/low catalyst temperature areas for SCR conversion efficiencies may be ignored, weighted less heavy, or otherwise not considered as heavily in order to reduce reliance on potentially inaccurate determinations in triggering the FC 2772/2773 codes. In some embodiments, in the event of a non-passing situation, the diagnostic circuit 161 may cause a derate condition for the engine 20 to be maintained (e.g., to limit the power output from the engine to, in turn, limit NOx and other emissions). In another embodiment, the diagnostic circuit 161 may be communicably coupled to a remote monitor (e.g., one or more remote servers, computers, etc.), such that the results of the NOx monitor reset process may be provided to the remote monitor. All such variations are intended to fall within the scope of the present disclosure.

Figure 3:
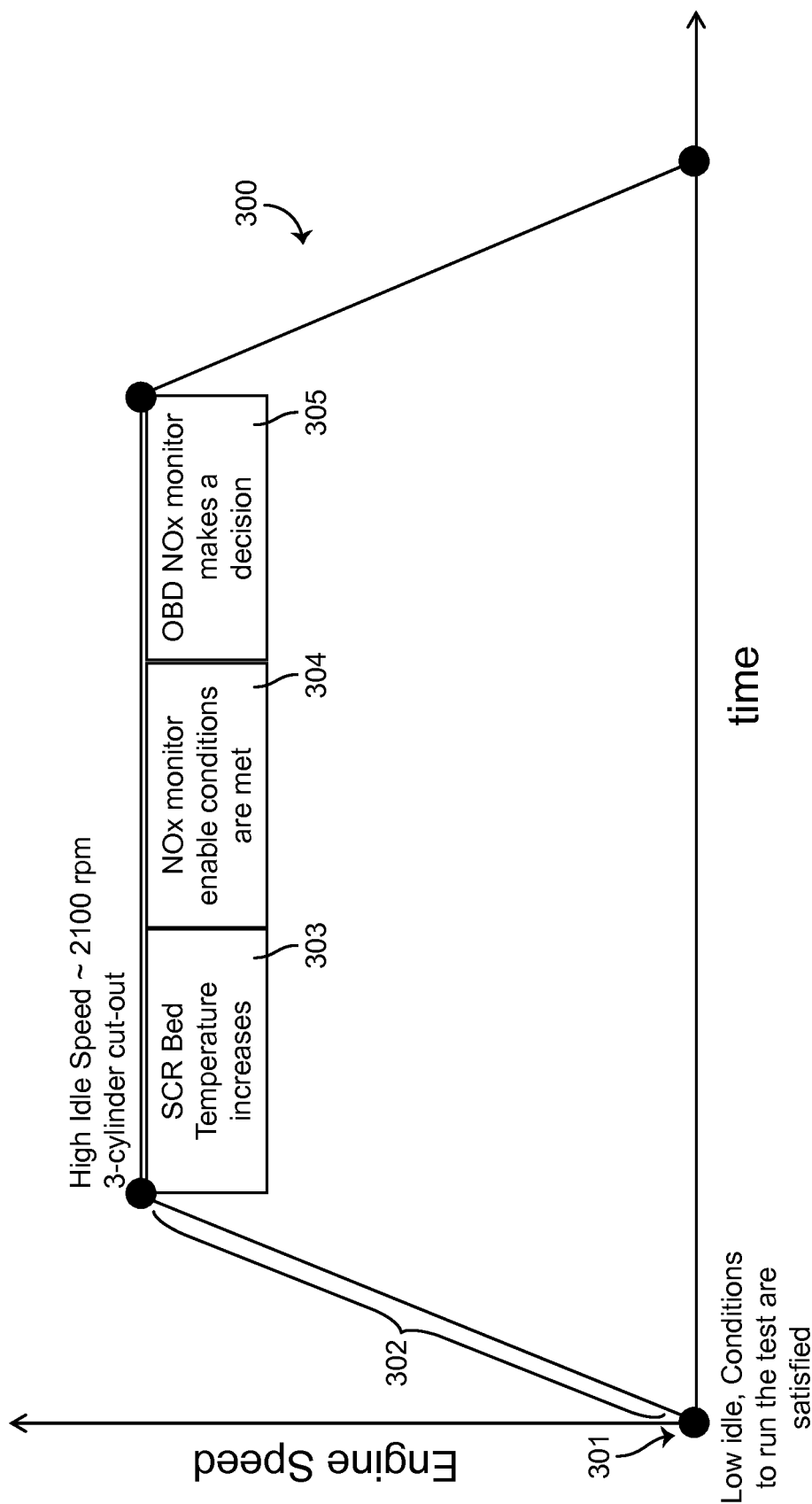
FIG. 3 is a schematic diagram of a graphical illustration of a NOx monitor reset process, according to an example embodiment.

Based on the foregoing, operation of the circuits 154-161 may be described as follows. In this regard, referring now to FIG. 3, a graphical illustration 300 of the NOx monitor reset process is shown, according to one embodiment. With reference to graph 300 and the controller 150, at point 301, the stationary conditions circuit 154 may determine that a stationary condition for the NOx monitor reset diagnostic is satisfied (e.g., the brake pedal is released, etc.). In response, the engine circuit 155 may cause ignition of the engine and allow the engine to idly operate for a predefined amount of time (e.g., five minutes) and at a predefined speed or range (section 302). In this example, the range is approximately 2100 RPM, where approximately may refer to plus-or-minus a predefined amount (e.g., 50 RPM) or any other definition accepted by those of ordinary skill in the art. Further, in this example, the engine circuit 155 implements a cylinder cutout mode to elevate exhaust gas temperatures. After operation for the predefined amount of time, the engine circuit 155 causes activation of the fan 21. During operation at 2100 RPM, the doser circuit 159 acquires data relating to the dosing system while the SCR circuit 157 acquires data indicative of a temperature of the SCR catalyst 50. After the SCR catalyst has reached a predefined temperature or range of temperatures (point or section 303), the NOx monitor reset circuit 156 may determine that an enable condition for the NOx monitor reset diagnostic is satisfied (point 304). In response, the system out NOx circuit 158 may command a measurement of NOx data out of the system 22. Simultaneously, prior to, or subsequently, the comparator NOx circuit 160 may determine an estimated NOx amount out of the system 22 based on operation of the engine 20. The comparator NOx circuit 160 may then compare the estimated NOx amount to the actual system out NOx amount to determine whether the system 22 is healthy or degraded (point 305). Beneficially, in this embodiment, the NOx monitor diagnostic process of the present disclosure facilitates NOx monitor checking without requiring operation of the vehicle (e.g., driving the vehicle) and with only one NOx sensor. In turn, operators may not be inconvenienced by having to drive their vehicle aimlessly and also be pleased because they need not waste resources (e.g., time, money, etc.) to perform such operations.

Figure 4:
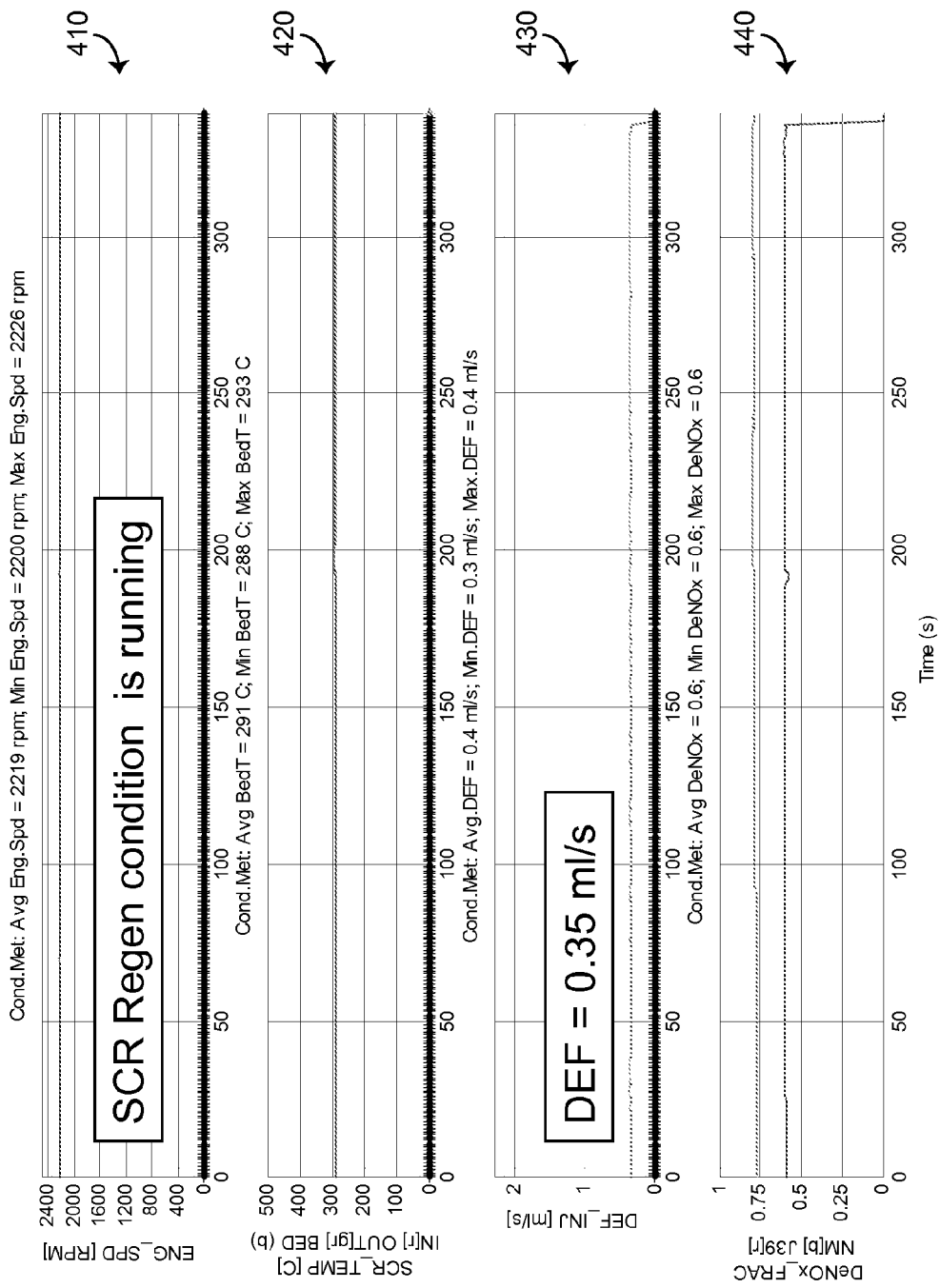
FIG. 4 is a series of graphs of conditions of a NOx monitor reset process for a healthy exhaust aftertreatment system, according to an example embodiment.

Referring now to FIGS. 4-10, example conditions indicative of a healthy exhaust aftertreatment system (FIGS. 4-7) and a degraded exhaust aftertreatment system (FIGS. 8-10) are illustrated. It should be understood that FIGS. 4-7 and FIGS. 8-10 may represent the results of the NOx monitor diagnostic process after the stationary condition is satisfied and the enable condition for the NOx monitor reset process has been triggered. Accordingly, referring first to the characteristics of a healthy system as shown in FIGS. 4-10, FIG. 4 illustrates engine speed versus time (graph 410), SCR temperature versus time (graph 420), DEF injection rate versus time (graph 430), and NOx reduction (known as DeNOx) versus time (graph 440). As shown in FIG. 4, during the NOx monitor reset process, characteristics of a healthy system include an average engine speed of 2219 RPM, a minimum engine speed of 2200 RPM, and a maximum engine speed of 2226 RPM; an average SCR bed temperature of 291 degrees Celsius, a minimum SCR bed temperature of 288 degrees Celsius, and a maximum SCR bed temperature of 293 degrees Celsius; an average DEF injection rate of 0.4 mL/s, a minimum DEF injection rate of 0.3 mL/s, and a maximum DEF injection rate of 0.4 mL/s; and, an average DeNOx fraction of 0.6, a minimum DeNOx fraction of 0.6, and a maximum DeNOx fraction of 0.6. As also shown in graph 410, in this example embodiment, an SCR regeneration condition is also being performed. The SCR regeneration condition may be configured to increase exhaust gas temperatures to increase a temperature in the SCR to burn off or otherwise disintegrate unwanted deposits on the SCR (e.g., soot and ash).

Figure 5:
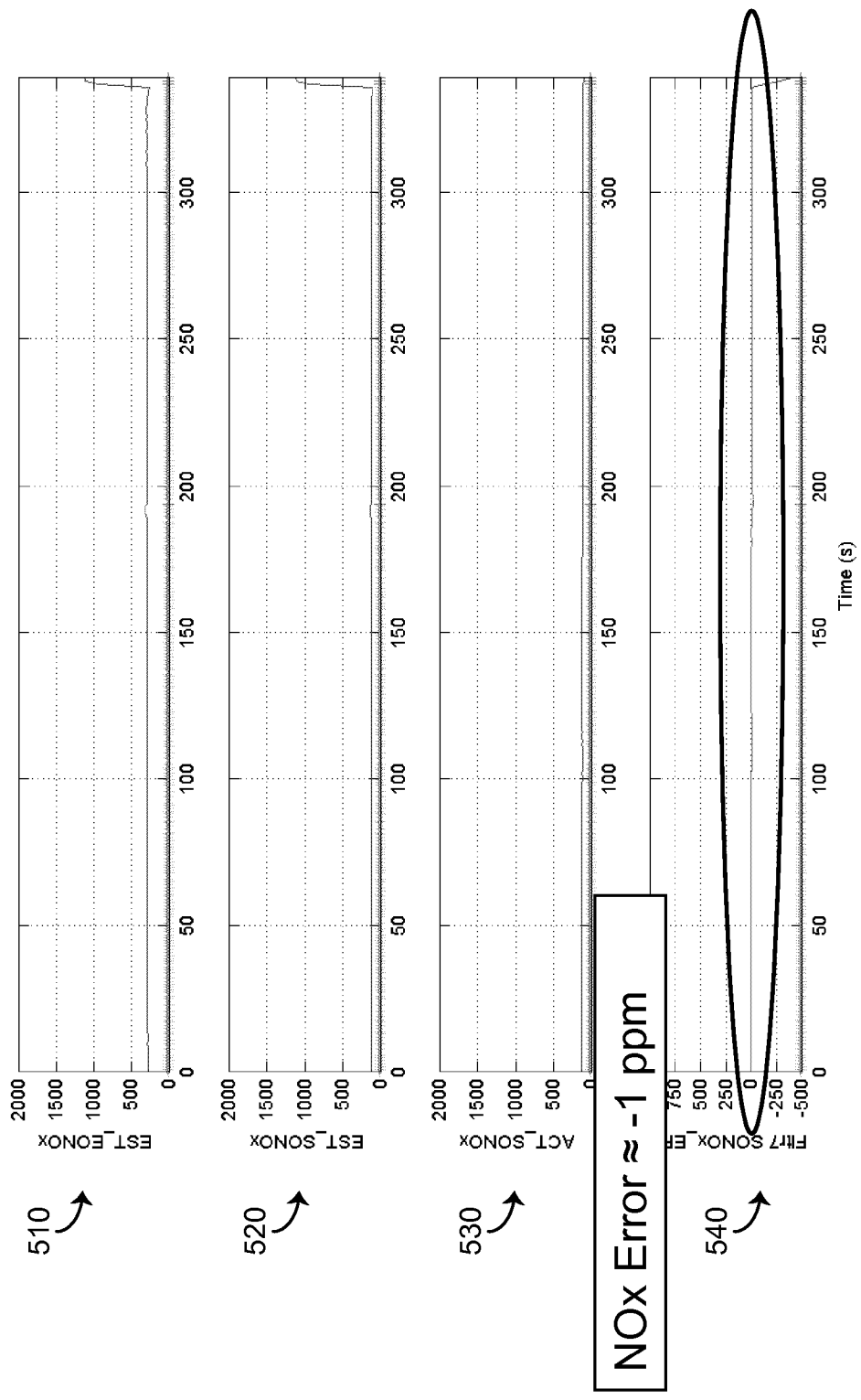
FIG. 5 is another series of graphs of conditions of a NOx monitor reset process for a healthy exhaust aftertreatment system, according to an example embodiment.

In comparison, FIG. 5 illustrates the NOx characteristics of a healthy aftertreatment system. More particularly, graph 510 illustrates an estimate engine out NOx amount versus time; graph 520 illustrates the estimated system out NOx amount versus time; graph 530 illustrates the actual system out NOx versus time; and, graph 540 illustrates the NOx error versus time. As such, graphs 510 and 520 may be determined by the comparator NOx circuit 160 while graph 530 may be determined by the system out NOx circuit 158 (e.g., via NOx sensor 12). The NOx error of graph 540 may be determined according to equation (1) below:

$$\text{NOx Error} = |(\text{System Out NOx}) - (\text{Estimated System Out Nox})| \quad (1)$$

Figure 6:
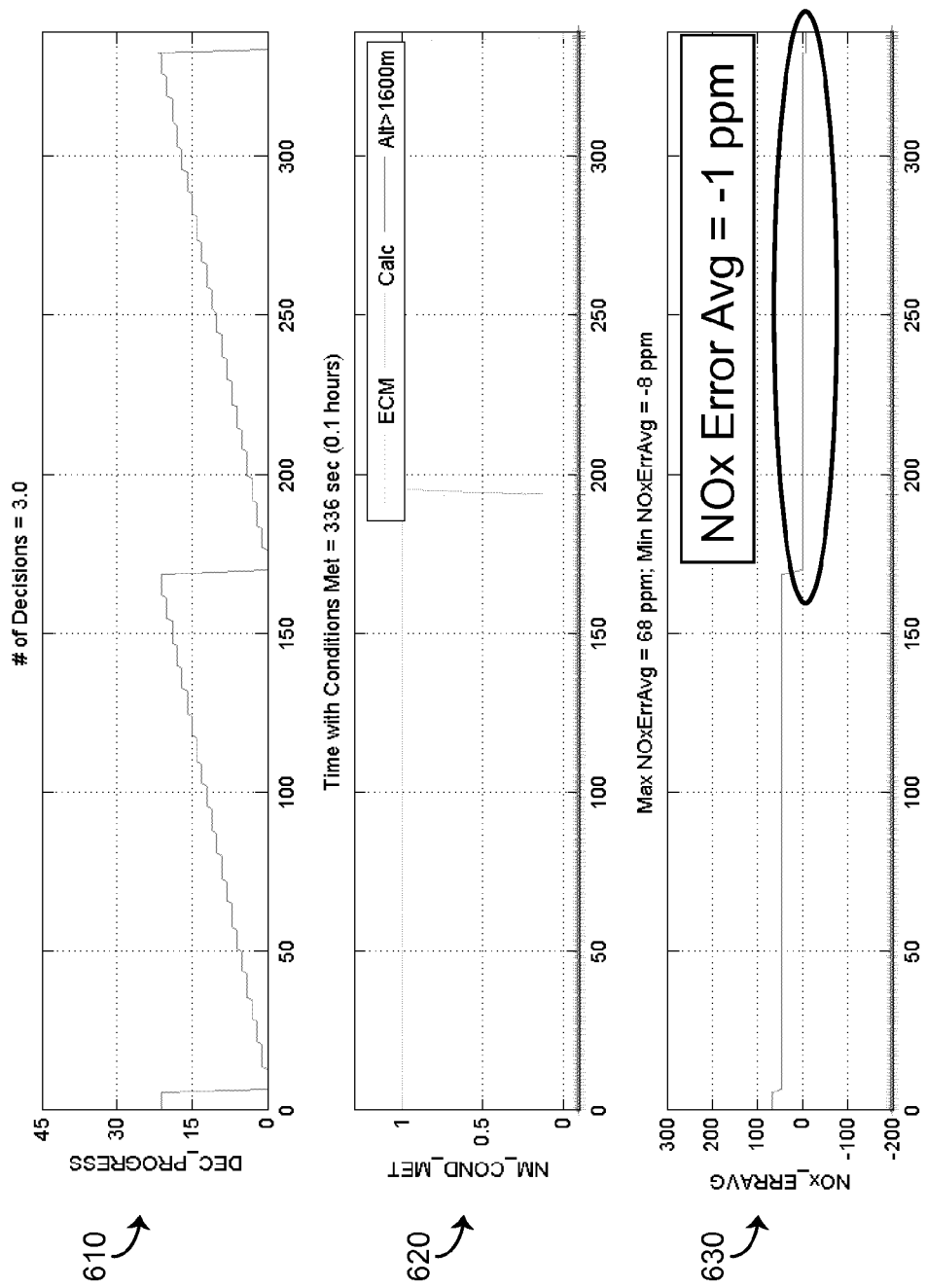
FIG. 6 is still another series of graphs of conditions of a NOx monitor reset process for a healthy exhaust aftertreatment system, according to an example embodiment.
Figure 7:
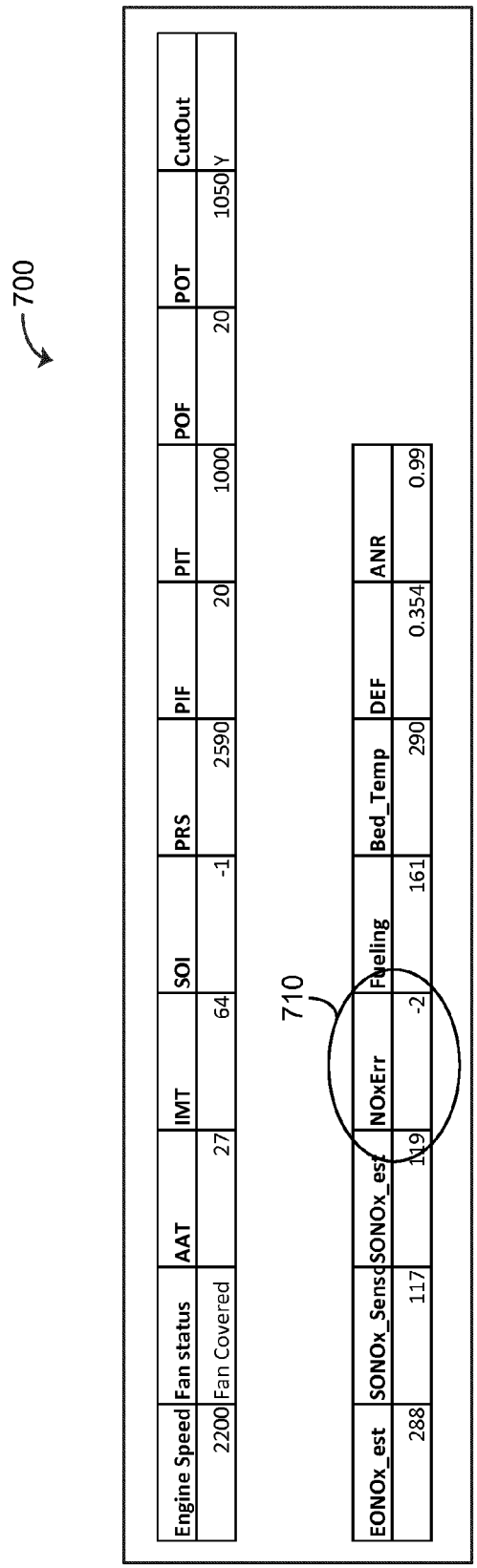
FIG. 7 is a table summarizing the results of a NOx monitor reset process for a healthy exhaust aftertreatment system, according to an example embodiment.

Referring to FIG. 6, graph 610 illustrates the number of NOx monitor reset processes decisions versus time, graph 620 illustrates the duration of how long conditions for the NOx monitor reset process are met, and graph 630 illustrates the NOx error average versus time. In this regard, graph 630 represents the NOx error average versus time, which may be based on graph 540. Referring next to FIG. 7, a table 700 summarizing the results of the NOx monitor reset process for a healthy system is illustrated, according to one embodiment. As shown, for a healthy aftertreatment system, the NOx error 710 is minus (−) 2 parts-per-million.

In this example embodiment, the comparator NOx circuit 160 made three PASS decisions (e.g., determined the system to be healthy) as shown in graph 610 of FIG. 6. In other embodiments, more or less decisions may be used to determine a PASS or FAIL situation. For example, in another embodiment, the comparator NOx circuit 160 may determine a PASS or FAIL condition based on more or less decisions (e.g., one, four, etc.). In another example, the comparator NOx circuit 160 may determine a PASS or FAIL condition based on certain characteristics of the decision. For example, three PASS decisions in a row equate to a PASS decision; or, in another example, a best out of five decisions may be used to determine the final decision; etc. Accordingly, many different configurations/logic may be used to determine a final decision regarding the NOx monitor reset process (e.g., whether a PASS condition is achieved that would cause the NOx monitor to reset or a FAIL condition is achieved that may require further exploration into the root of the problem).

Further, in this example, the comparator NOx circuit 160 utilizes a single digit NOx error range to make a decision (e.g., −2 PPM NOx error). In other embodiments, another value greater than single digits (e.g., plus-or-minus 10 PPM) may be used to define PASS and FAIL conditions. In still another embodiment, different parameters may be used to define PASS and FAIL conditions (e.g., a standard deviation of the determined NOx error from equation (1), etc.). Accordingly, those of ordinary skill in the art will appreciate that many different parameters may be used to define PASS and FAIL conditions, such that the aforementioned disclosure is not meant to be limiting and meant to be broadly interpreted.

Figure 8:
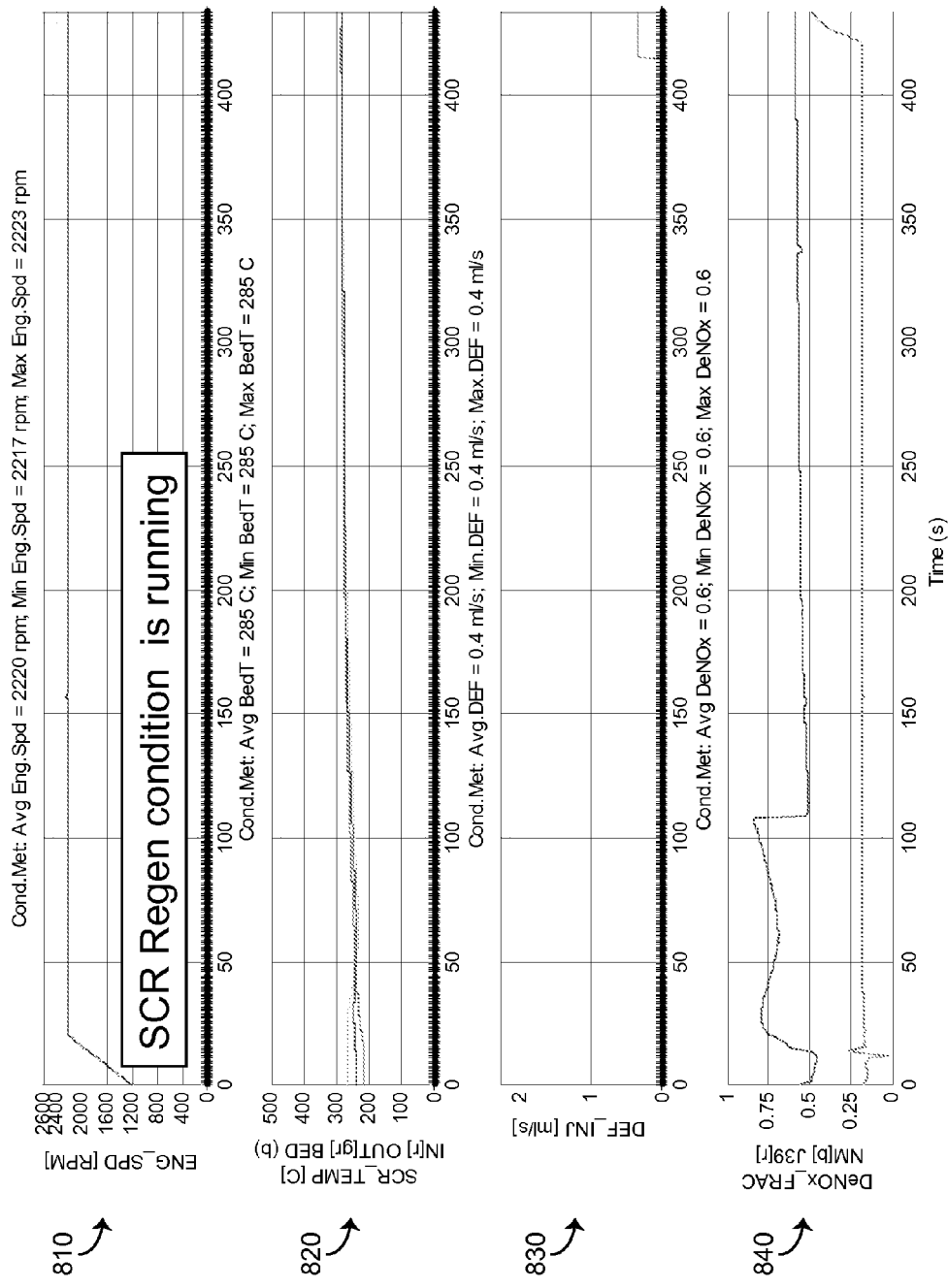
FIG. 8 is a series of graphs of conditions of a NOx monitor reset process for a degraded exhaust aftertreatment system, according to an example embodiment.
Figure 9:
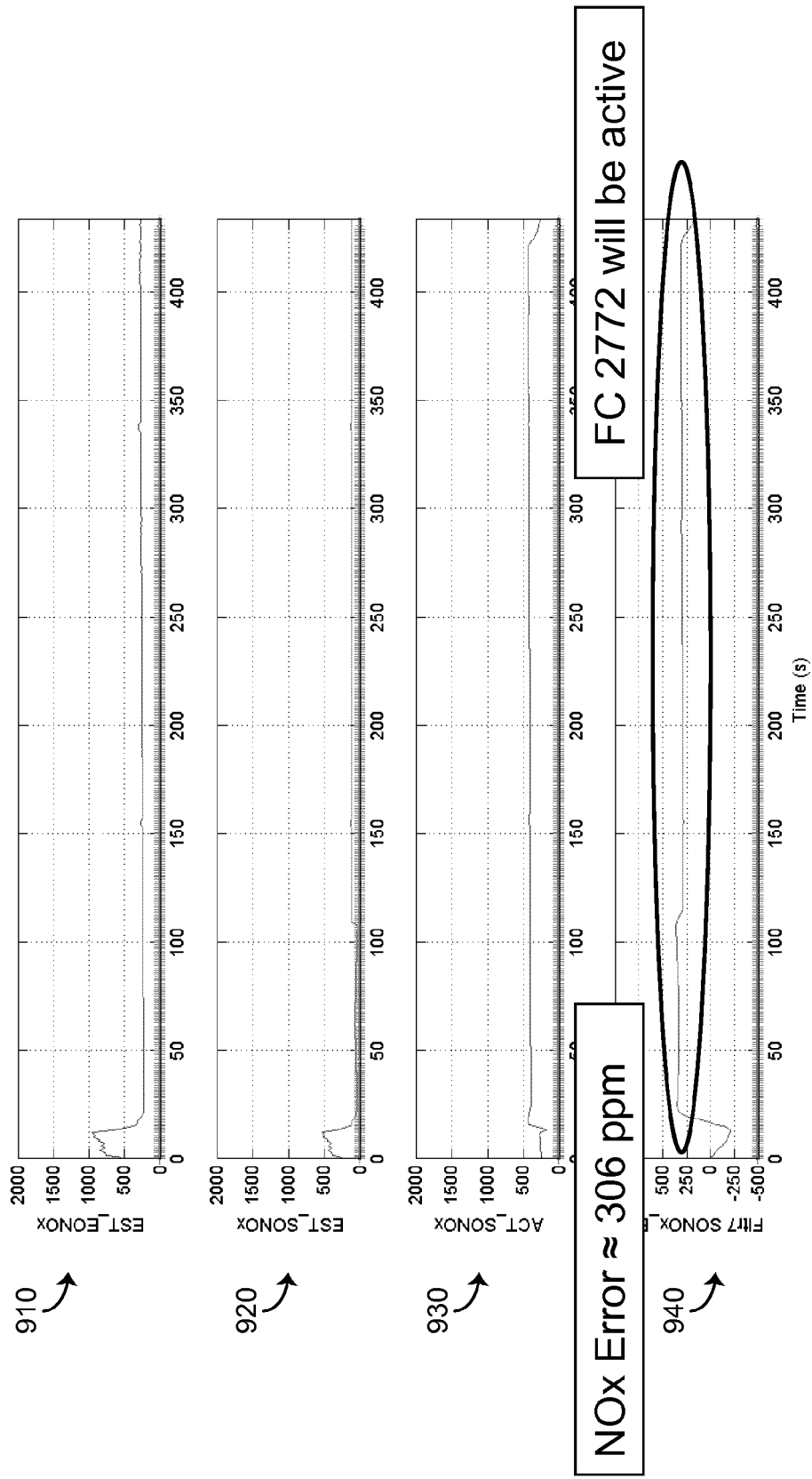
FIG. 9 is another series of graphs of conditions of a NOx monitor reset process for a degraded exhaust aftertreatment system, according to an example embodiment.

Referring now to FIGS. 8-10, example conditions indicative of a degraded system are illustrated. FIG. 8 illustrates engine speed versus time (graph 810), SCR temperature versus time (graph 820), DEF injection rate versus time (graph 830), and NOx reduction (known as DeNOx) versus time (graph 840). As shown in FIG. 8, during the NOx monitor reset process, characteristics of a degraded system include an average engine speed of 2220 RPM, a minimum engine speed of 2217 RPM, and a maximum engine speed of 2223 RPM; an average SCR bed temperature of 285 degrees Celsius, a minimum SCR bed temperature of 285 degrees Celsius, and a maximum SCR bed temperature of 285 degrees Celsius; an average DEF injection rate of 0.4 mL/s, a minimum DEF injection rate of 0.3 mL/s, and a maximum DEF injection rate of 0.4 mL/s; and, an average DeNOx fraction of 0.6, a minimum De NOx fraction of 0.6, and a maximum DeNOx fraction of 0.6. As will be appreciated, the conditions for a healthy and a degraded system are the same or similar.

In comparison, FIG. 9 illustrates the NOx characteristics of a degraded aftertreatment system. More particularly, graph 910 illustrates an estimated engine out NOx amount versus time; graph 920 illustrates the estimated system out NOx amount versus time (e.g., the NOx emitted into the atmosphere); graph 930 illustrates the actual system out NOx versus time; and, graph 940 illustrates the NOx error versus time. As such, graphs 910 and 920 may be determined by the comparator NOx circuit 160 while graph 930 may be determined by the system out NOx circuit 158 (e.g., via NOx sensor 12).

Referring next to FIG. 10, a table 1000 summarizing the results of the NOx monitor reset process for a degraded exhaust aftertreatment system is illustrated, according to one embodiment. As shown, for a degraded aftertreatment system, the NOx error 1010 is three-hundred and six (306) PPM (compare to FIG. 7 where, for a healthy system, a healthy system had a NOx error of −2 PPM). In this regard, the fairly large NOx error relative to that of a healthy system is indicative of an inability of the system to accurately or substantially accurately track the NOx emissions from the system. An inability to track NOx results may result in the system emitting NOx amounts above a certain predefined threshold, such that said system may be out of compliance.

It should be understood that FIGS. 4-10 represent only one illustration of the characteristics of a healthy and a degraded aftertreatment system during the performance of the NOx monitor reset process. Accordingly, other exhaust aftertreatment system configurations (e.g., without an AMOx catalyst, a different positioning of the components, etc.) may correspond with different characteristics indicative of healthy and degraded exhaust aftertreatment systems.

Figure 11:
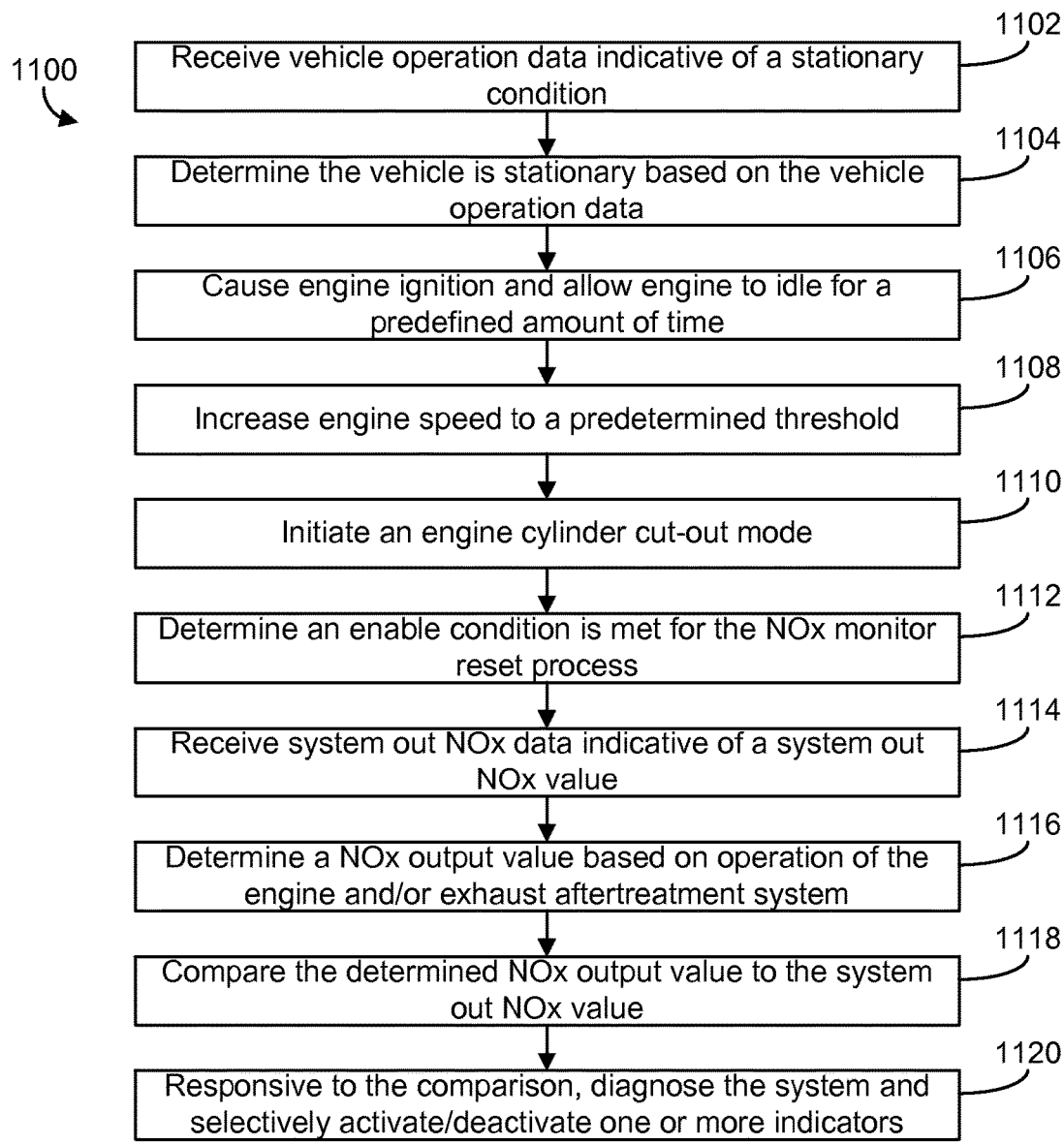
FIG. 11 is a flow diagram of a method of a NOx monitor reset process, according to an example embodiment.

Referring now to FIG. 11, a flow chart of a method 1100 of a NOx monitor reset process is illustrated, according to one embodiment. Because the method 1100 may be implemented with the controller 150, reference to one or more components of the controller 150 may be used in explanation of the method 1100.

At process 1102, vehicle operation data indicative of a stationary condition is received. Vehicle operation data may include any vehicle operation data or information indicative of a stationary condition for enabling the NOx monitor reset process. Accordingly, the vehicle operation data may include, but is not limited to, an indication of a parking brake being released, an indication of a transmission setting of park or neutral, a vehicle speed of zero, an indication of a clutch pedal being released, and any of the aforementioned information. At process 1104, the vehicle is determined to be in a stationary condition sufficient for enabling the NOx monitor reset process based on the stationary conditions information. In one embodiment, all of the aforementioned stationary condition information is required for process 1104. In another embodiment, only a certain amount of predefined stationary condition information is required for process 1104 (e.g., a vehicle speed of zero and a transmission setting of park or neutral, etc.). In still another embodiment, an override condition may be used where an operator, user, or technician may explicitly indicate that the stationary condition is satisfied for the NOx monitor reset process.

At process 1106, the engine of the vehicle is started and allowed to idle for a predefined amount of time, wherein the predefined amount of time may be intended to warm-up the engine. Accordingly, those of ordinary skill in the art will appreciate that a predefined amount of time can be an absolute time duration or a condition indicative of a warmed-up engine and system (e.g., based on a temperature of the engine, based on an oil temperature, based on an aftertreatment system temperature, etc.).

At process 1108, the engine speed is increased to a predetermined threshold or range. According to one embodiment, the predetermined threshold or range is approximately 2100 RPM. In another embodiment, the predetermined range is between 1800 RPM and 2100 RPM. In parallel with, prior to, or subsequent to, an engine cylinder cut-out mode is initiated (process 1110). As mentioned above, engine cylinder cut-out mode refers to operation of the engine using less than all of the combustion cylinders. For example, utilizing three out of six cylinders to power the engine for an extended period of time may be a cylinder cut-out mode.

During the engine cylinder cut-out mode and the relatively high engine speed, an enable condition for the NOx monitor reset diagnostic is detected (process 1112). According to one embodiment, the enable condition is based on a detected, determined, or estimated SCR temperature being at or above a predefined threshold (e.g., via the SCR temperature circuit 157). The predefined threshold may be any threshold indicative of an elevated SCR temperature, such as an absolute value (e.g., 300 degrees Celsius) or a range indicative of an elevated SCR temperature. According to another embodiment, various other aforementioned enable conditions may be used to trigger the NOx monitor reset process. For example, the enable condition may further include any condition indicative of an elevated temperature in the exhaust aftertreatment system. For example, a temperature sensor at or near a DOC or DPF may indicate that the temperature is above a certain value (e.g., 300 degrees Celsius), which may also indicate an enable condition. In another example, another enable condition may be indicative of a flow rate through the exhaust aftertreatment system. In this regard, an elevated flow rate may indicate relatively more severe/heavier load conditions. The enable condition flow rate may be an absolute value, a range, or some other indicator that may be used by those of ordinary skill in the art.

In response to the enable condition being detected, system out NOx data is received (process 1114). The system out NOx data may be received from a NOx sensor, such as NOx sensor 12, and is indicative of the NOx amount that is exiting the aftertreatment system during the aforementioned operating conditions.

At process 1116, an estimated NOx output value is determined based on operating conditions of the engine and/or aftertreatment system. Process 1116 may be performed by the comparator NOx circuit 160, wherein the comparator NOx circuit 160 may utilize one or more formulas, algorithms, models, and the like that estimate an engine out NOx amount and/or a system out NOx amount responsive to the conditions of the engine-exhaust aftertreatment system (e.g., engine speed, engine torque, fueling rate, etc.).

Figure 18:
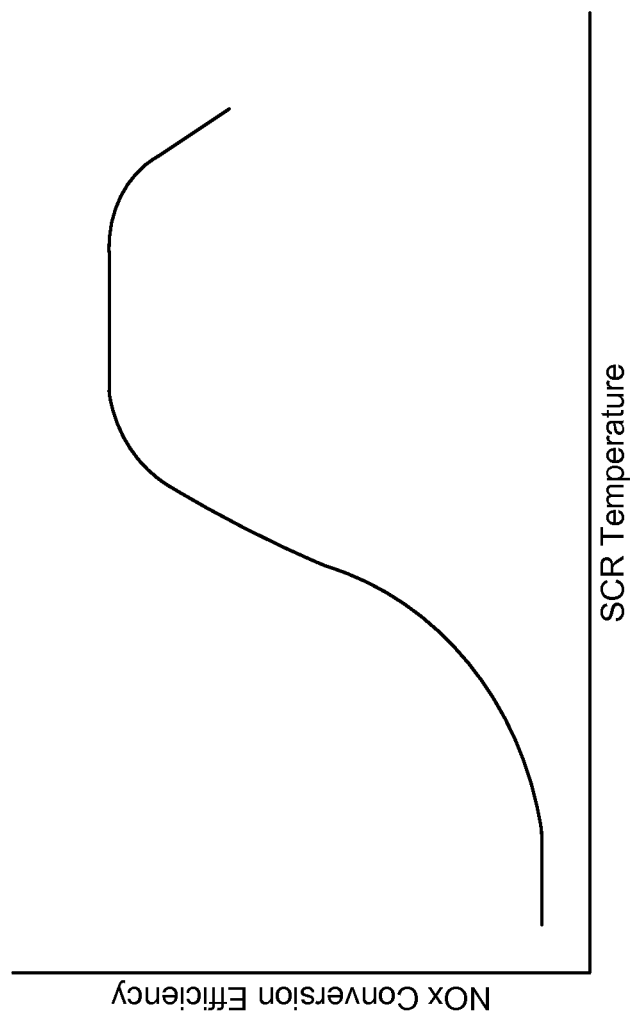
FIG. 18 is a graph of NOx conversion efficiency versus selective catalytic reduction (SCR) catalyst temperature, according to an example embodiment.

An example process for determining the estimated NOx output value may be described as follows. In one embodiment, the NOx output value may be used to determine an estimated NOx reduction value, which may also be referred to as NOx conversion efficiency, which is indicative of how much NOx has been reduced by the aftertreatment system. Accordingly, the estimated NOx output value may be determined based on values indicative of an exhaust gas flow, an SCR temperature, an ammonia dosing rate, and an engine out NOx rate. Using these values, estimated NOx amounts may be determined at various engine/aftertreatment system operating conditions. With reference to FIG. 18, as shown, at low SCR temperatures (e.g., less than approximately 190 degrees Celsius where "approximately" may refer to plus-or-minus 5 degrees Celsius; less than or equal to a temperature considered to be "low" for an SCR catalyst in an exhaust aftertreatment system; and/or any other acceptable definition by those of ordinary skill in the art for a "low" SCR temperature), NOx conversion efficiency is relatively low. Similarly, at high SCR temperatures (e.g., greater than approximately 450 degrees Celsius where "approximately" may refer to plus-or-minus 5 degrees Celsius; greater than or equal to a temperature considered to be "high" for an SCR catalyst in an exhaust aftertreatment system; and/or any other acceptable definition by those of ordinary skill in the art for a "high" SCR temperature), NOx conversion efficiency is also relatively low. Rather, NOx conversion efficiency is relatively highest at intermediate SCR temperatures (e.g., between the "low" and "high" SCR temperature range). As described above, such a characteristic may be reasoning why the FC 2772/2773 may discount or use low weighting before activation at high/low SCR temperatures.

The following reactions may be representative of the chemical reactions at low, intermediate, and high SCR temperatures:

Reactions at Low SCR Temperatures:

$$2NH_3+2NO_2 \rightarrow NH_4NO_3+N_2+H_2O \quad (2)$$

$$2NH_3+2NO_2 \rightarrow N_2O+N_2+3H_2O \quad (3)$$

Reactions at Intermediate SCR Temperatures:

$$4NH_3+2NO+2NO_2 \rightarrow 4N_2+6H_2O \text{ (fast SCR)} \quad (4)$$

$$4NH_3+4NO+O_2 \rightarrow 4N_2+6H_2O \text{ (standard SCR)} \quad (5)$$

$$4NH_3+6NO \rightarrow 5N_2+6H_2O \quad (6)$$

$$8NH_3+6NO_2 \rightarrow 7N_2+12H_2O \quad (7)$$

Reactions at High SCR Temperatures:

$$4NH_3+4NO+3O_2 \rightarrow 4N_2O+6H_2O \quad (8)$$

$$4NH_3+5O_2 \rightarrow 4NO+6H_2O \quad (9)$$

$$4NH_3+4O_2 \rightarrow 2N_2O+6H_2O \quad (10)$$

$$4NH_3+3O_2 \rightarrow 2N_2+6H_2O \quad (11)$$

It should be understood that more, less, and/or different reaction equations may be used for each of the low, intermediate, and high SCR temperature ranges. Further, in certain embodiments, no temperature range demarcations with associated reactions may be used while in other embodiments, more or less temperature range demarcations with associated reactions may be used. Accordingly, the aforementioned temperature range demarcations and reactions are illustrative only. In this example, based on the temperature data indicative of an SCR temperature and the other vehicle operation data (e.g., dosing data, etc.), the controller 150 may determine/estimate a system out NOx value using the aforementioned equations (2)-(11) (which can be used to determine a NOx conversion efficiency). Equations (2)-(11) may be embodied as one or more look-up tables, models, and the like in the controller 150 to facilitate relatively fast determinations. Accordingly, using equations (2)-(11), a system out NOx value may be determined/estimated, which then may be compared with the measured system out NOx value (process 1118).

At process 1118, the determined NOx output value is compared to the system out NOx value. Responsive to the comparison, the exhaust aftertreatment system is diagnosed (process 1120). According to one embodiment, if the comparison is at or within a predefined range, then the system is determined healthy. The predefined range may be defined as described above. According to one embodiment, one or more decisions (e.g., PASS or FAIL) may be required before a final determination is made. All such variations are intended to fall within the scope of the disclosure.

In response to the diagnosis, one or more indicators may be selectively activated. The indicators may include fault codes and/or indicator lamps. The indicators may also include conditions that may restrain NOx output from determined FAIL conditions, such as maintaining an engine derate condition.

Referring now to FIGS. 12-17, example operating conditions for the NOx monitor reset process of FIG. 11 is shown, according to one embodiment. In each table of FIGS. 12-17, the x-column refers to the engine speed and the y-row refers to fueling inputs. Based on the x and y inputs, the value in the table represents the corresponding value generated in response to these conditions (i.e., FIGS. 12-17 are three-dimensional tables). Table 1 below may be used to define the terms used in each of FIGS. 12-17. It should be understood that the values of FIGS. 12-17 are illustrative only and many other values may be generated based on different engine-exhaust aftertreatment systems. In this regard, the data presented in FIGS. 12-17 are intended to illustrate the results of method 1100 according to an example embodiment.

TABLE 1

Definitions for Terms used in FIGS. 12-17.

| Term | Description | Units |
| --- | --- | --- |
| Final Timing | Main engine start of injection | Degrees before Top Dead Center |
| Rail Pressure | Fuel injection pressure | Bar |
| Pilot Fueling Quantity | Pilot fuel injection quantity | mg/str |
| Pilot Fueling Timing | Pilot fuel injection timing | uSec before main injection event |
| Post Fueling Quantity | Post fuel injection quantity | mg/str |
| Post Fueling Timing | Post fuel injection timing | uSec after main injection event |

It should be understood that no claim element herein is to be construed under the provisions of 35 U.S.C. §112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as processor 152 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on a RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer (such as via the controller 150 of FIGS. 1-2), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An electronic controller, comprising:
 a stationary conditions circuit structured to received information indicative of a stationary condition of a vehicle having an exhaust aftertreatment system;
 an engine circuit coupled to the stationary conditions circuit, wherein the engine circuit is structured to cause an elevated operating mode in response to the detection of the stationary condition; and
 a nitrous oxide (NOx) monitor reset circuit communicably coupled to the stationary conditions circuit and the engine circuit, wherein the NOx monitor reset circuit is structured to:
  receive vehicle operation data indicative of an enable condition for a NOx monitor reset process;
  in response to the enable condition, receive NOx data indicative of a measured NOx amount exiting the exhaust aftertreatment system as part of the NOx monitor reset process;
  estimate a NOx amount exiting the exhaust aftertreatment system as part of the NOx monitor reset process;
  compare the measured NOx amount to the estimated NOx amount; and
  in response to the comparison, selectively diagnose the exhaust aftertreatment system as one of a healthy and a degraded exhaust aftertreatment system.

2. The electronic controller of claim 1, wherein the elevated operating mode includes causing an engine fluidly coupled to the exhaust aftertreatment system to operate in a cylinder cutout mode, the cylinder cutout mode including using less than a total number of cylinders of the engine.

3. The electronic controller of claim 1, wherein the enable condition includes an elevated temperature condition of a component in the exhaust aftertreatment system.

4. The electronic controller of claim 3, wherein the elevated temperature condition is based on a temperature of a selective catalytic reduction (SCR) catalyst being at or above a predefined threshold.

5. The electronic controller of claim 1, wherein the enable condition includes a flow rate of exhaust gas through the exhaust aftertreatment system.

6. The electronic controller of claim 1, wherein the elevated operating mode includes causing an engine fluidly coupled to the exhaust aftertreatment system to operate at a predefined engine speed range.

7. The electronic controller of claim 1, wherein the stationary condition is based on information indicating at least one of: a clutch pedal being released, a transmission setting in one of a park setting and a neutral setting, a parking brake being released, a vehicle speed of zero miles-per-hour, a brake pedal being released, and an accelerator pedal being released.

8. The electronic controller of claim 1, wherein the NOx monitor reset circuit is structured to diagnose the aftertreatment system as healthy responsive to the comparison being at or within a predefined range.

9. The electronic controller of claim 1, wherein the NOx monitor reset circuit is structured to cause at least one of an activation of an indicator lamp, a maintaining activation of an indicator lamp, an activation of a derate condition for an engine, and a maintaining activation of a derate condition for the engine in response to diagnosing the aftertreatment system as degraded.

10. A method, comprising:
 receiving, by a controller, vehicle operation data indicative of a stationary condition for a vehicle having an engine fluidly coupled to an exhaust aftertreatment system;
 causing, by the controller, a speed of the engine to operate in an elevated condition;
 determining, by the controller, an enable condition for a nitrous oxide (NOx) monitor reset process;
 in response to the determined enable condition, receiving, by the controller, a measured system out NOx value;
 estimating, by the controller, a system out NOx amount;
 comparing, by the controller, the measured system out NOx value to the estimated system out NOx amount; and
 in response to the comparison, selectively diagnosing, by the controller, the exhaust aftertreatment system as one of a healthy and a degraded exhaust aftertreatment system.

11. The method of claim 10, wherein the speed of the engine is between 1800 and 2150 revolutions-per-minute.

12. The method of claim 10, wherein the elevated condition further includes operating the engine in a cylinder cutout mode.

13. The method of claim 10, wherein the stationary condition is based on information indicating at least one of: a clutch pedal being released, a transmission setting in one of a park setting and a neutral setting, a parking brake being released, a vehicle speed of zero miles-per-hour, a brake pedal being released, and an accelerator pedal being released.

14. The method of claim 10, wherein the enable condition includes a temperature condition of a component in the exhaust aftertreatment system.

15. The method of claim 14, wherein the temperature condition is based on a temperature of a selective catalytic reduction (SCR) catalyst being at or above a predefined threshold.

16. A system, comprising:
an engine;
an exhaust aftertreatment system in exhaust gas communication with the engine; and
a controller communicably and operatively coupled to the engine and the exhaust aftertreatment system, wherein the controller is structured to:
  receive vehicle operation data indicative of a stationary condition for a vehicle having the engine and the exhaust aftertreatment system;
  determine an enable condition is satisfied for the engine and exhaust aftertreatment system;
  in response to the determined enable condition, receive system out nitrous oxide (NOx) data indicative of a measured NOx amount exiting the exhaust aftertreatment system;
  estimate a NOx amount exiting the exhaust aftertreatment system;
  compare the measured NOx amount to the estimated NOx amount; and
  in response to the comparison, selectively diagnose the exhaust aftertreatment system as one of a healthy and a degraded exhaust aftertreatment system.

17. The system of claim 16, wherein the controller is included with the vehicle having the engine and the exhaust aftertreatment system.

18. The system of claim 16, wherein the controller is a service tool, wherein the service tool is a separate component from the vehicle.

19. The system of claim 16, wherein the stationary condition is based on information indicating at least one of: a clutch pedal being released, a transmission setting in one of a park setting and a neutral setting, a parking brake being released, a vehicle speed of zero miles-per-hour, a brake pedal being released, and an accelerator pedal being released.

20. The system of claim 16, wherein in response to the determined enable condition, the controller is further structured to increase a speed of the engine to an elevated condition and cause operation of the engine in a cylinder cutout mode.

* * * * *